United States Patent
Takahashi et al.

[11] Patent Number: 6,121,972
[45] Date of Patent: Sep. 19, 2000

[54] NAVIGATION SYSTEM, METHOD FOR STEREOSCOPICALLY DISPLAYING TOPOGRAPHIC MAP FOR THE NAVIGATION SYSTEM, AND RECORDING MEDIUM RECORDING THE METHOD

[75] Inventors: Toshiaki Takahashi; Norimasa Kishi; Masaki Watanabe, all of Yokohama, Japan

[73] Assignee: Nissan Motor Co., Ltd., Kanagawa, Japan

[21] Appl. No.: 09/130,443

[22] Filed: Aug. 6, 1998

[30] Foreign Application Priority Data

Aug. 11, 1997 [JP] Japan .................................. 9-216736

[51] Int. Cl.[7] .................................................. G06F 15/00
[52] U.S. Cl. .............................................................. 345/419
[58] Field of Search ..................................... 345/419, 421, 345/427, 441, 443, 420; 348/44, 45, 46, 47; 382/190, 201

[56] References Cited

U.S. PATENT DOCUMENTS

| | | | |
|---|---|---|---|
| 6,011,581 | 1/2000 | Swift et al. | 345/419 |
| 6,023,276 | 1/2000 | Kawai et al. | 345/419 |
| 6,031,564 | 2/2000 | Ma et al. | 48/43 |

FOREIGN PATENT DOCUMENTS 5-101163  4/1993  Japan .

Primary Examiner—Phu K. Nguyen
Attorney, Agent, or Firm—McDermott, Will & Emery

[57] ABSTRACT

In a method for stereoscopically displaying the topographic map, a navigation system, and the recording medium recording the method, a multiple number of quadrilaterals with mutually adjoining four points of terrain locations as four vertices of each quadrilateral from the three-dimensional road map information are generated, each quadrilateral is divided into four triangles with one or two diagonal lines of each quadrilateral, a perspective projection transformation of three vertices of each triangle is performed onto a predetermined perspectively projected plane, a display color is allocated to each of the perspectively projected triangles, and the allocated display color is displayed on an image screen of a display device together with each of the perspectively projected triangles.

17 Claims, 32 Drawing Sheets

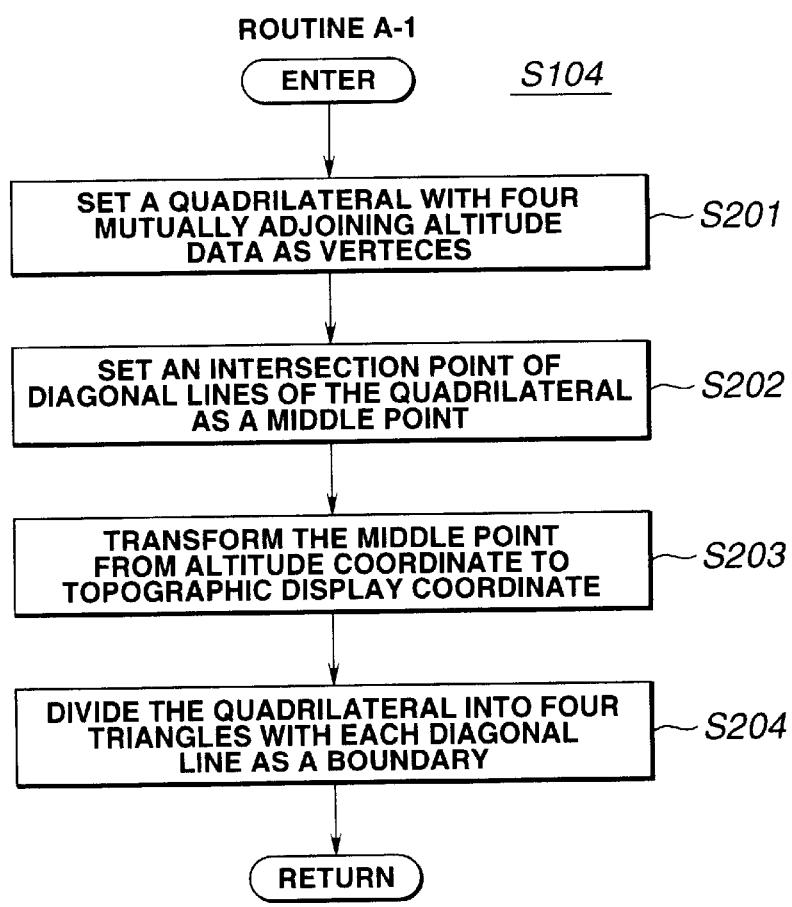
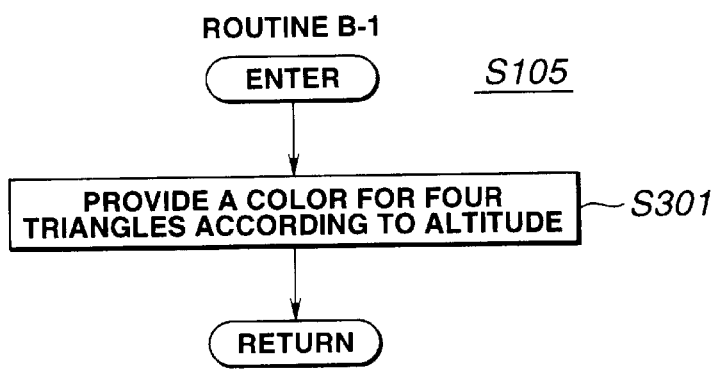

NAVIGATION SYSTEM, METHOD FOR STEREOSCOPICALLY DISPLAYING TOPOGRAPHIC MAP FOR THE NAVIGATION SYSTEM, AND RECORDING MEDIUM RECORDING THE METHOD

The contents of the Application No. Heisei 9-216736, with a filing date of Aug. 11, 1997 in Japan, are herein incorporated by reference.

BACKGROUND OF THE INVENTION a) Field of the Invention

The present invention relates to a method for stereoscopically displaying a topographic map for a navigation system, the navigation system, and a recording medium for recording stereoscopically topographic display program of performing a stereoscopic display processing of the topographic map which is capable of being mounted in the navigation system.

b) Description of the Related Art

In a case where a perspective projection representation for a stereoscopically topographic map is performed in a navigation system using a computer, the computer reads a three-dimensional road map data distributed by a predetermined density in a grid (lattice) form from a three-dimensional road map information recording unit constituted by a CD-ROM, PD (Phase optical Disc), MO disc, DVD, or another large-capacity type recording medium performs a perspective projection transformation with quadrilaterals having vertices of altitude data on four mutually adjoining points of (terrain) locations as three-dimensional graphics to derive data on graphical drawing data in a form of the perspective projection representation (from a single point, viz., a viewpoint and, hereinafter, also called a bird's eye view) on an image screen of a display unit.

However, since, in the case of the bird's eye view representation, a first region to be displayed which is near to the viewpoint is relatively expanded and a second region to be displayed which is remote from the viewpoint is relatively reduced in scale, a quantity of calculations to perform the perspective projection transformation becomes tremendous in addition to a large number of points of locations, especially, at a position remote from the viewpoint when the computer reads the three-dimensional data at constant intervals of the grids not dependently upon a distance from the viewpoint and performs the perspective projection transformation therefor.

A Japanese Patent Application First Publication No. Heisei 5-101163 published on Apr. 23, 1993 exemplifies a previously proposed method for performing a three-dimensional graphic display.

In the above-identified Japanese Patent Application First Publication, each interval between the grids is varied according to its distance from the viewpoint so that the intervals of the grids at the second region are elongated (becomes coarse).

Therefore, the number of points of terrain locations to be displayed within the bird's eye view representation are reduced so that the quantity of calculations are reduced.

Consequently, a speed of displaying the bird's eye view representation on the image screen of the display unit can be quickened.

SUMMARY OF THE INVENTION

However, in the previously proposed method for performing the three-dimensional graphic display disclosed in the above-identified Japanese Patent Application First Publication, four vertices of each quadrilateral are frequently transformed into the perspective projection representation in a twisted state when each quadrilateral having the altitude data of four mutually adjoining points of locations as four vertecies is perspectively projected as the three-dimensional graphic and is often erroneously displayed as the three-dimensional graphic which is largely different from an actual topographic representation.

In addition, even if an interval between each altitude data for graphically drawing of the second region is elongated to a degree for a viewer not to lose a feeling of depth, the number of altitude data are still many, it takes a lot of time to perform graphically drawing of the second region as compared with the case of the first region. Consequently, a speed of graphically drawing the whole region to be displayed becomes slow.

It is therefore an object of the present invention to provide a method for stereoscopically displaying a topographic map for a navigation system, the navigation system, and a recording medium for recording a stereoscopically topographic may display program which can display a stereoscopically topographic map in a three-dimensional topographic representation which is not largely different from an actual topographic representation (an actual terrain), which can shorten a graphical drawing time of the topographic form of the second region to be displayed which is remote from the viewpoint without loss of the feeling of depth, and which can quicken the drawing speed of the whole region to be displayed.

The above-described object can be achieved by providing a method of stereoscopically displaying a topographic map for a navigation system. The method comprises the steps of: a) reading a three-dimensional road map information belonging to a predetermined region to be displayed from a road map information recording medium; b) generating virtually a multiple number of quadrilaterals with mutually adjoining four points of terrain locations as four vertices of each quadrilateral from the read three-dimensional road map information; c) connecting two couples of the vertices, each couple in a diagonal relationship, by respective two diagonal lines of each quadrilateral so as to derive a position of a middle point of each quadrilateral; d) dividing each quadrilateral into four triangles with the connected two diagonal lines; e) deriving an altitude of each middle point from the read three-dimensional road map information; f) performing a perspective projection transformation of three vertices of each triangle including the middle point of the corresponding quadrilateral divided into each triangle onto a predetermined perspectively projected plane with a first predetermined position as a viewpoint for the perspective projection and a second predetermined position as an origin of the predetermined perspectively projected plane; g) allocating a display color to each of the perspectively projected triangles; and h) displaying the allocated display color on an image screen of a display device together with each of the perspectively projected triangles.

The above-described object can also be achieved by providing a method of stereoscopically displaying a topographic map for a navigation system. The method comprises the steps of: a) reading a three-dimensional road map information belonging to a predetermined region to be displayed from a road map information recording medium; b) generating virtually a multiple number of quadrilaterals with mutually adjoining four points of terrain location as four vertices of each quadrilateral from the read three-dimensional road map information;

c) selecting one of two diagonal lines of each quadrilateral according to a solid geometric form based on altitudes of the four vertices of each quadrilateral; d) connecting one couple of two vertices in a diagonal relationship from among the four vertices of each quadrilateral by the selected diagonal line; e) dividing each quadrilateral into two triangles by the selected diagonal line; f) performing a perspective projection transformation of the three vertices of each triangle onto a predetermined perspectively projected plane with a first predetermined position as a viewpoint for the perspective projection and a second predetermined position as an origin of the predetermined perspectively projected plane; g) allocating a display color to each of the perspectively projected triangles; and h) displaying the allocated display color on an image screen of a display device together with each of the perspectively projected triangles.

The above-described object can also be achieved by providing an apparatus of stereoscopically displaying a topographic map for a navigation system. The apparatus comprises: a) a storage unit for recording a three-dimensional road map information; b) a reader for reading the three-dimensional road map information belonging to a predetermined region to be displayed from the storage unit; c) a quadrilateral forming block for generating virtually a multiple number of quadrilaterals with mutually adjoining four points of terrain locations as four vertices of each quadrilateral from the read three-dimensional road map information; d) a middle point altitude deriving block for connecting two couples of the vertices, each couple in a diagonal relationship, by respective two diagonal lines of each quadrilateral so as to derive a position of a middle point of each quadrilateral; e) a triangle divider for dividing each quadrilateral into four triangles with the connected two diagonal lines; f) an altitude deriving block for deriving an altitude of each middle point from the read three-dimensional road map information; g) a perspective projection transforming block for performing a perspective projection transformation of the vertices of each triangle including the corresponding middle point onto a predetermined perspectively projected plane with a first predetermined position as a viewpoint for the perspective projection and a second predetermined position as an origin of the predetermined perspective projection; h) a color allocating block for allocating a display color to each of the perspectively projected triangles; and i) a drawing processing block for displaying the allocated display color on an image screen of a display device together with each of the perspectively projected triangles.

The above-described object can also be achieved by providing an apparatus of stereoscopically displaying a topographic map for a navigation system. The apparatus comprises: a) a road map information recording medium for recording a three-dimensional read map information; b) a reader for reading a three-dimensional road map information belonging to a predetermined region to be displayed from a road map information recording medium; c) a quadrilateral forming block for generating virtually a multiple number of quadrilaterals with mutually adjoining four points of terrain locations as four vertices of each quadrilateral from the read three-dimensional road map information; d) a triangle former for selecting one of two diagonal lines of each quadrilateral according to a solid geometric form based on altitudes of the four vertices of each quadrilateral and connecting one couple of two vertices in a diagonal relationship by the selected diagonal line; e) a triangle divider for dividing each quadrilateral into two triangles with the selected diagonal line; f) a perspective projection transforming block for performing a perspective projection transformation of the vertices of each triangle onto a predetermined perspectively projected plane with a first predetermined position as a viewpoint for the perspective projection and a second predetermined position as an origin of the predetermined perspectively projected plane; g) a color allocator for allocating a display color to each of the perspectively projected triangles; and h) a drawing processing block for displaying the allocated display color on an image screen of a display device together with each of the perspectively projected triangles.

The above-described object can also be achieved by providing a medium of recording a stereoscopically topographic map display program. The program has the steps of: a) reading a three-dimensional road map information belonging to a predetermined region to be displayed from a road map information recording medium; b) generating virtually a multiple number of quadrilaterals with mutually adjoining four points of terrain locations as four vertices of each quadrilateral from the read three-dimensional road map information; c) connecting two couples of the vertices, each couple in a diagonal relationship, by respective two diagonal lines of each quadrilateral so as to derive a position of a middle point of each quadrilateral; d) dividing each quadrilateral into four triangles with the connected two diagonal lines; e) deriving an altitude of each middle point from the read three-dimensional road map information; f) performing a perspective projection transformation of three vertices of each triangle including the middle point of the corresponding quadrilateral divided into each triangle onto a predetermined perspectively projected plane with a first predetermined position as a viewpoint for the perspective projection and a second predetermined position as an origin of the predetermined perspectively projected plane; g) allocating a display color to each of the perspectively projected triangles; and h) displaying the allocated display color on an image screen of a display device together with each of the perspectively projected triangles.

The above-described object can also be achieved by providing a medium of recording a stereoscopically topographic map display program. The program has the steps of: a) reading a three-dimensional road map information belonging to a predetermined region to be displayed from a road map information recording medium; b) generating virtually a multiple number of quadrilaterals with mutually adjoining four points of terrain location as four vertices of each quadrilateral from the read three-dimensional road map information; c) selecting one of two diagonal lines of each quadrilateral according to a solid geometric form based on altitudes of the four vertices of each quadrilateral; d) connecting one couple of two vertices in a diagonal relationship from among the four vertices of each quadrilateral by the selected diagonal line; e) dividing each quadrilateral into two triangles by the selected diagonal line; f) performing a perspective projection transformation of the three vertices of each triangle onto a predetermined perspectively projected plane with a first predetermined position as a viewpoint for the perspective projection and a second predetermined position as an origin of the predetermined perspectively projected plane; g) allocating a display color to each of the perspectively projected triangles; and h) displaying the allocated display color on an image screen of a display device together with each of the perspectively projected triangles.

BRIEF DESCRIPTION OF THE DRAWINGS

FIG. 10 is a detailed flowchart of a routine A as a routine A-1 in the first embodiment shown in FIG. 1A.

FIG. 11 is a detailed flowchart of a routine B as a routine B-1 in the first embodiment shown in FIG. 1A.

BEST MODE FOR CARRYING OUT THE INVENTION

Reference will hereinafter be made to the drawings in order to facilitate a better understanding of the present invention.

(First Embodiment)

Figure 1A:
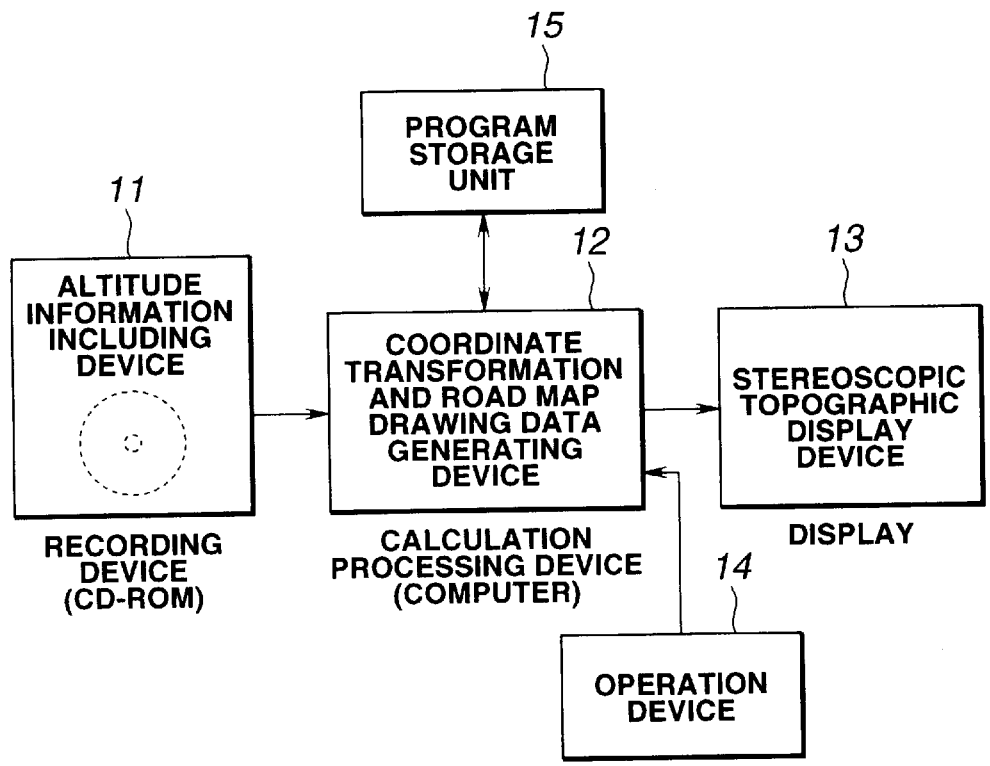
FIG. 1A is a schematic circuit block diagram of a navigation system carrying out a method for displaying stereoscopically a topographic road map in a first preferred embodiment according to the present invention.

FIG. 1A shows a navigation system for a mobile body such as an automotive vehicle which carries out a stereoscopic topographic map display using a method for stereoscopically displaying the stereoscopic topographic map in a first preferred embodiment according to the present invention.

Figure 1B:
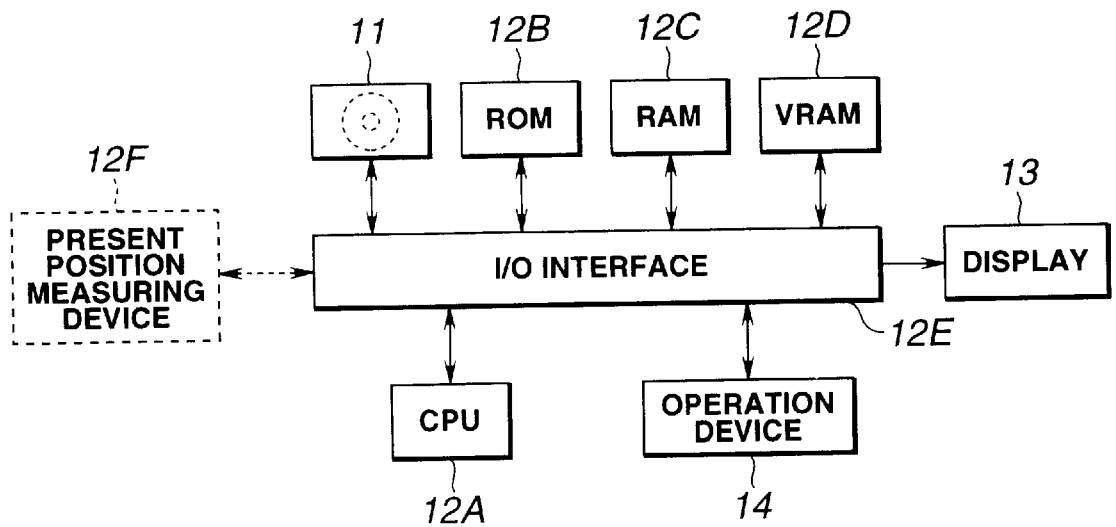
FIG. 1B is a schematic hardware circuit block diagram of the navigation system shown in FIG. 1A.

In FIG. 1A, the navigation system includes: a road map information recording device 11 having a recording medium recording thereon a three-dimensional road map information including a plurality of altitude data such as inserted CD (Compact disc)-ROM, MO (Magneto-optical) disc, DVD (Digital Video Disc), or another large memory capacity recording medium and which reads out the three-dimensional road map information over a specified region to be displayed; a calculation processing device 12 constituted by a microcomputer having a RAM (Random Access Memory) 12C, ROM (Read Only Memory) 12B, CPU (Central Processing Unit) 12A, VRAM (Video Random Access Memory) 12D, and I/O interface 12E as shown in FIG. 1B and which executes a stereoscopic topographic road map drawing data; a display unit 13 such as a liquid crystal flat display or a CRT (Cathode Ray Tube) display; and an operation device 14 such as a keyboard, a pointing device such as a joystick, and/or a remote controller which issues a predetermined operation command to the calculation processing device 12.

A program storage unit 15 is built in the calculation processing device 12.

The program storage unit 15 registers thereinto the stereoscopic topographic (terrain) display program. The calculation processing device 12 executes the program to generate the stereoscopic topographic (terrain) drawing data and outputs the stereoscopic topographic (terrain) drawing data to the display unit 13 so as to enable a bird's eye view representation of the stereoscopic topographic road map.

FIG. 1B shows the hardware circuit structure of the navigation system. It is noted that in FIG. 1B, a present position measuring device 12F as will be described later is connected to the I/O interface 12E.

A program storage unit 15 registers thereinto the stereoscopic topographic (terrain) display program.

The calculation processing device 12 executes the program to generate the stereoscopic topographic (terrain) drawing data and outputs the stereoscopic topographic (terrain) drawing data to the display unit 13 so as to enable a bird's eye view representation of the stereoscopic topographic road map.

It is noted that the stereoscopic topographic (terrain) display program registered into the program storage unit 15 may be copies and registered thereto from the program recording medium inserted into the recording device (CD-ROM drive) 11 or alternatively may be preinstalled into the program storage unit 11 constituted by the ROM 12B when the calculation processing device 12 is installed as the navigation system in the mobile body, viz., during a manufacture of the navigation system.

Figure 4:
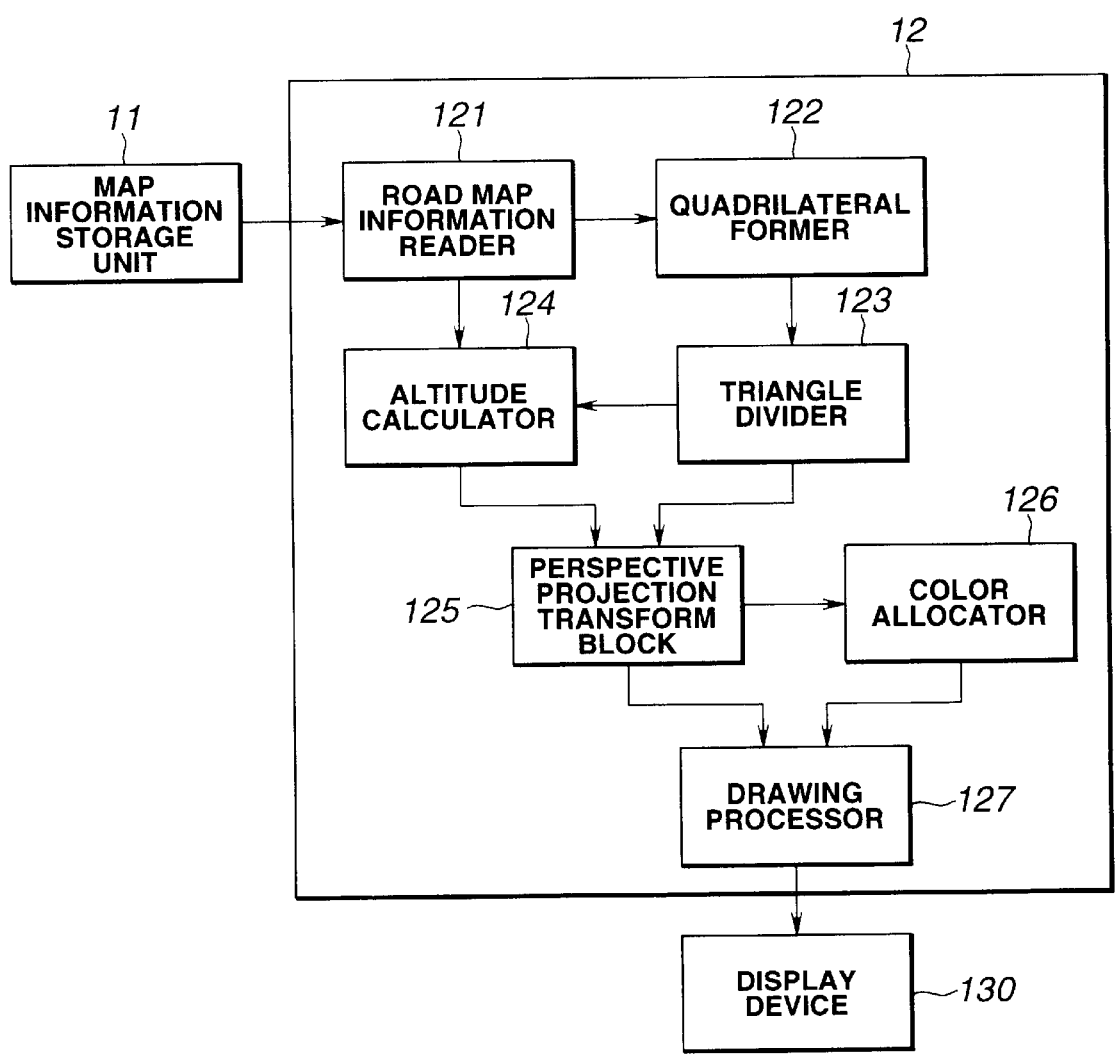
FIG. 4 is a schematic functional block diagram representing functions performed by a calculation processing device shown in FIG. 1A.

FIG. 4 shows a functional block diagram of the calculation processing device 12 shown in FIG. 1.

The calculation processing device 12 includes: a road map information reading block (a road map information reader) 121 for reading the three-dimensional road map information belonging to a predetermined region of a road map as will be described later from the road map information recording device 11; a quadrilateral forming block (a quadrilateral former) 122 for virtually forming (generating) a multiple number of quadrilaterals, each quadrilateral having vertices of mutually adjoining four points of locations, from the three-dimensional road map information belonging to the predetermined region and read by the road map information reading block 121; a triangle division block (a triangle divider) 123 for connecting two of the four vertices by the diagonal line and the other two of the four vertices by its diagonal line, for each virtually formed (generated) quadrilateral, to determine a position of a middle point of each quadrilateral; and for dividing each virtually formed (generated) triangle into four triangles; an altitude calculator 124 for determining an altitude of each middle point determined by the triangle divider 123 from the three-dimensional road map information belonging to the predetermined region; a perspective projection transformer 125 for performing a perspective projection transformation of the vertices of each triangle on a predetermined projected flat plane with a predetermined position as a viewpoint and with a predetermined position as an origin; a color allocator 126 for allocating a display color to each perspectively projected triangle by the perspective projection transformer 125; and a drawing processor 127 for displaying the display color allocated by the color allocator 126 together with each triangle perspectively projection transformation by the perspective projection transformer 125.

The method of stereoscopically displaying the topographic road map display in the first embodiment executed by the navigation system will be described below.

Figure 5:
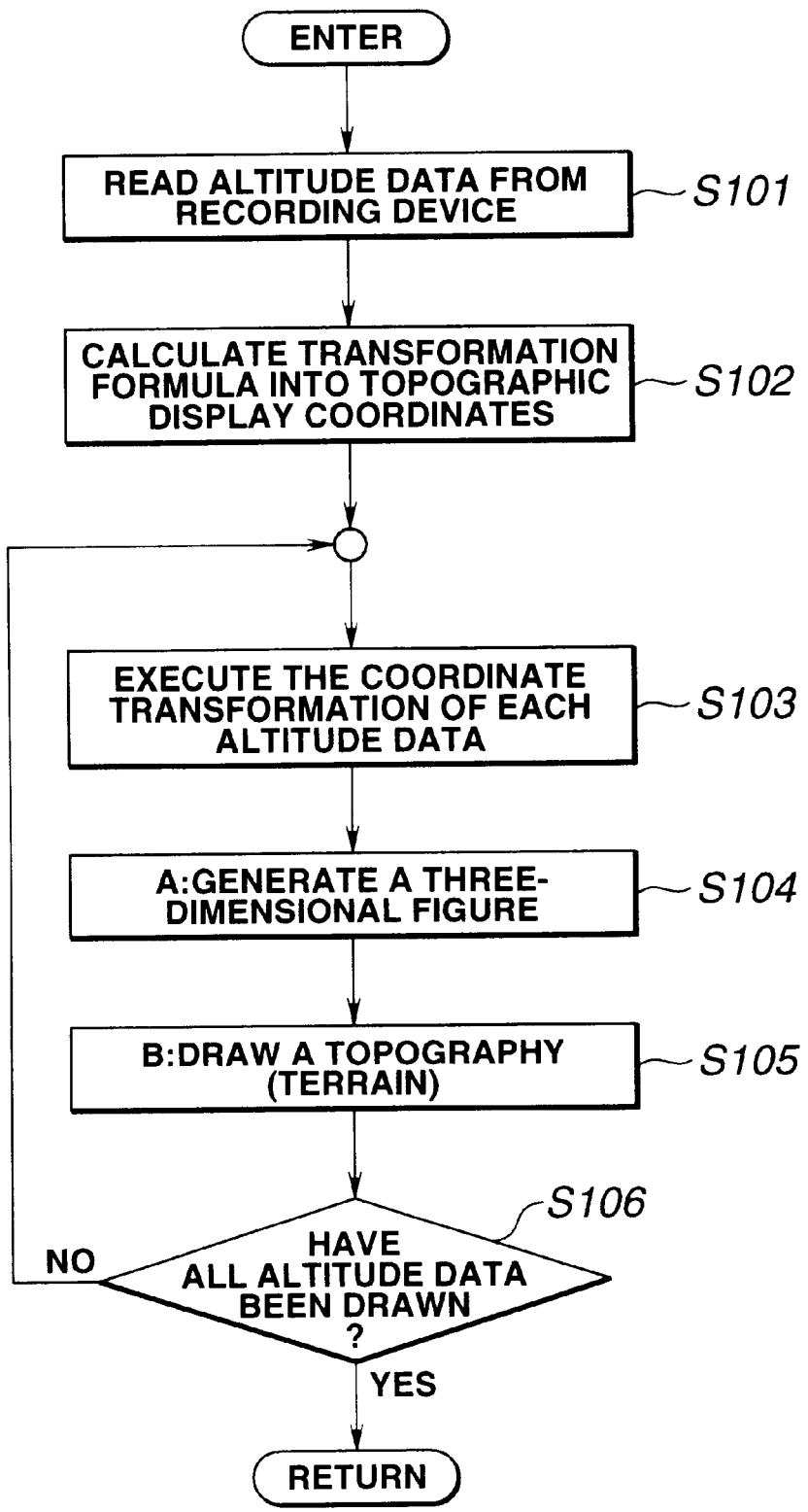
FIG. 5 is an operational flowchart representing a main routine executed by the calculation processing device shown in FIG. 1A.

FIG. 5 shows a main routine of executing the stereoscopically topographic road map display method in the first preferred embodiment according to the present invention.

In FIG. 5, at a step S101, the CPU 12A, viz., the calculation processing device 12 accesses the road map recording medium inserted into the recording device 11 to read the three-dimensional road map information belonging to the region of the road map to be displayed into its RAM 12B when a user (operator) specifies the region of the road map to be displayed and a degree of scale in the calculation processing device 12 (actually, the calculation processing device 12, i.e., the CPU 12A automatically calculates the region of the road map to be displayed and the degree of scale according to an operation through the operation device 14 by a telephone number specification or by measuring and inputting a present position of the mobile body such as the vehicle or forwarding direction thereof from the present position measuring device 12F constituted by a GPS (Global Positioning System) sensor, a mobile body speed sensor, and/or a gyroscope).

Next, at a step S102, the CPU 12A, viz., the calculation processing device 12 calculates a formula of the transformation from three-dimensional coordinates including an altitude coordinate into a terrain display coordinate in the following procedure.

Figure 6:
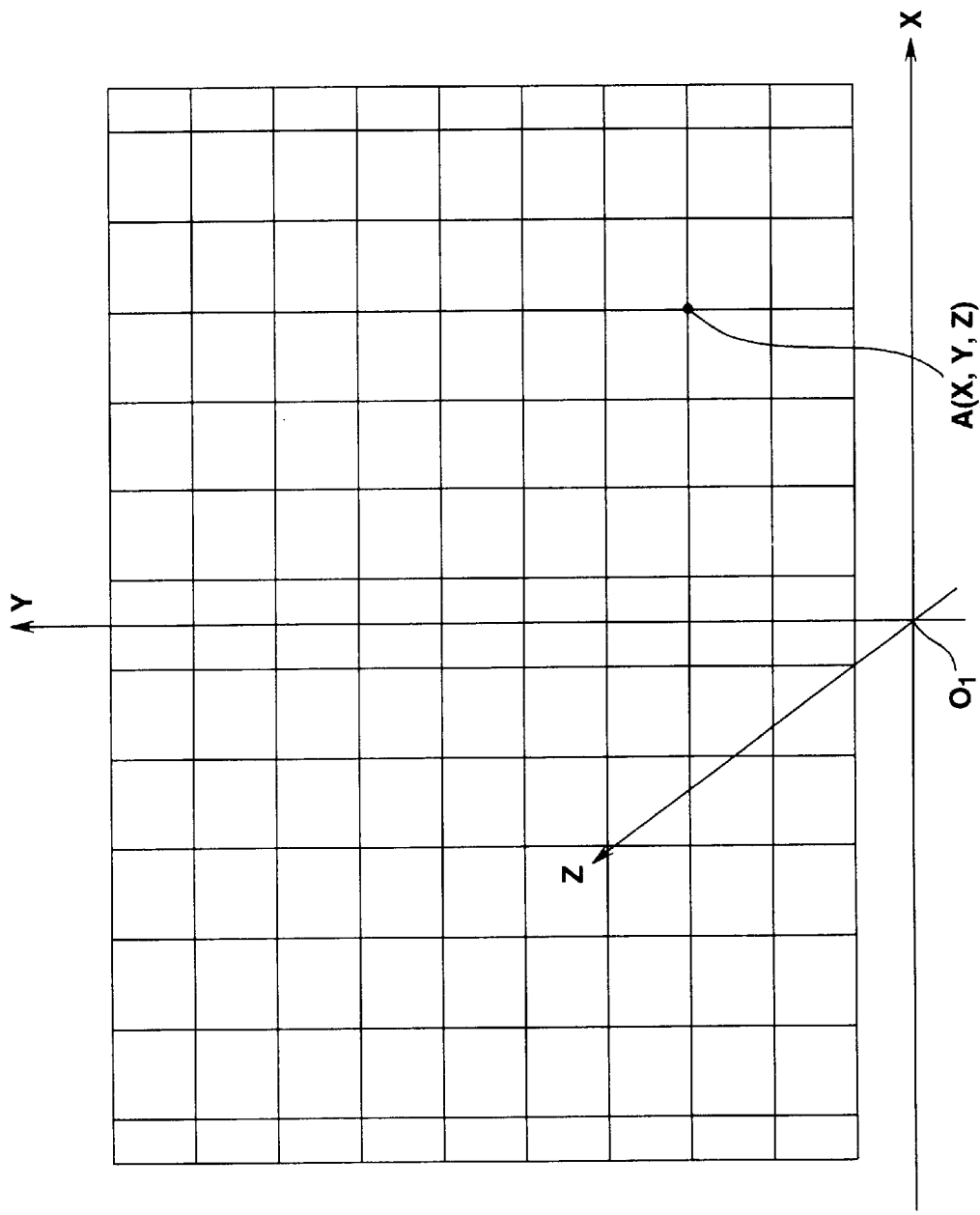
FIG. 6 is an explanatory view for explaining three-dimensional coordinates including an altitude coordinate in the first embodiment shown in FIG. 1A.
Figure 7:
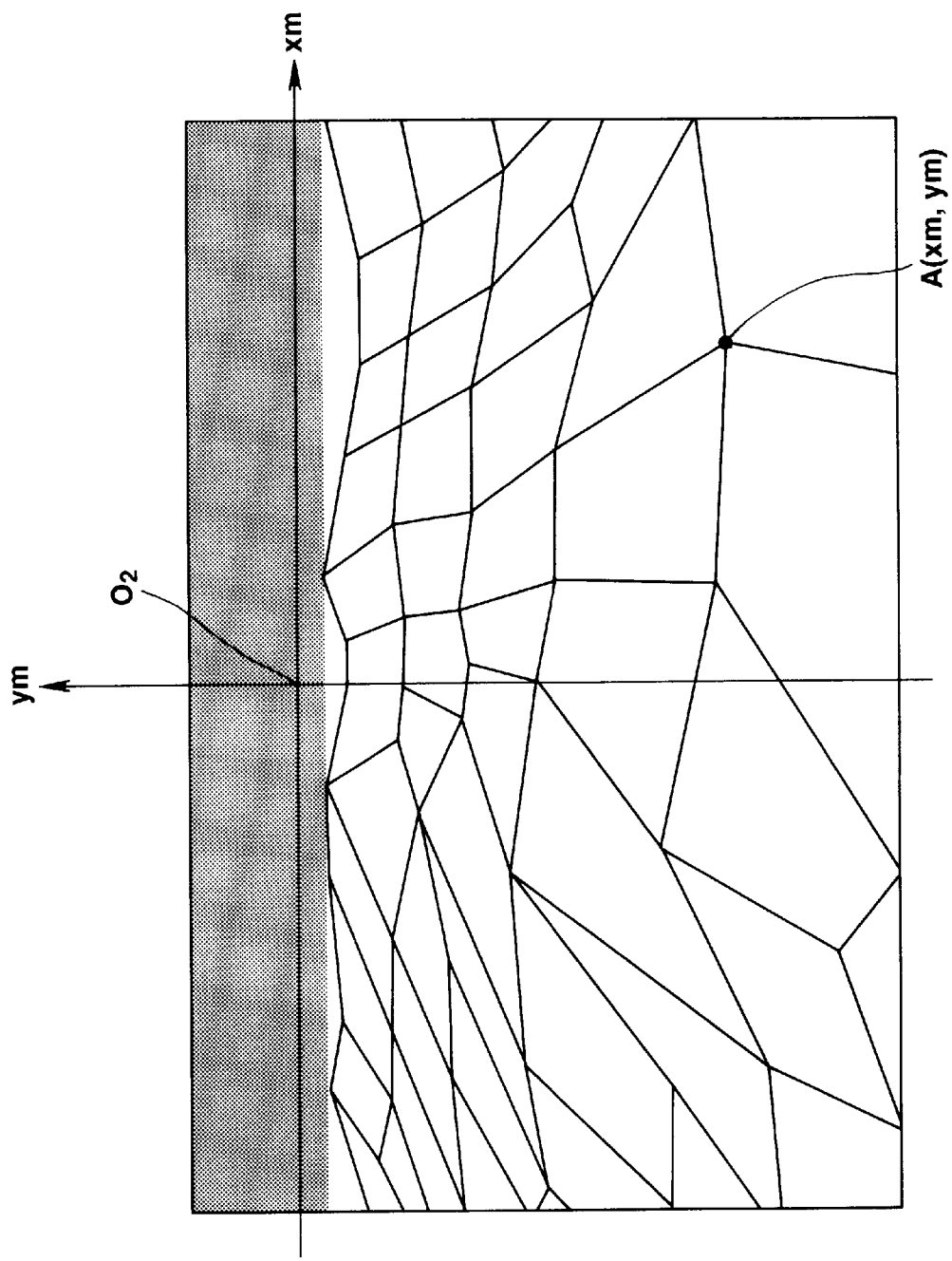
FIG. 7 is an explanatory view for explaining topographic display coordinates in the first embodiment shown in FIG. 1A.
Figure 8:
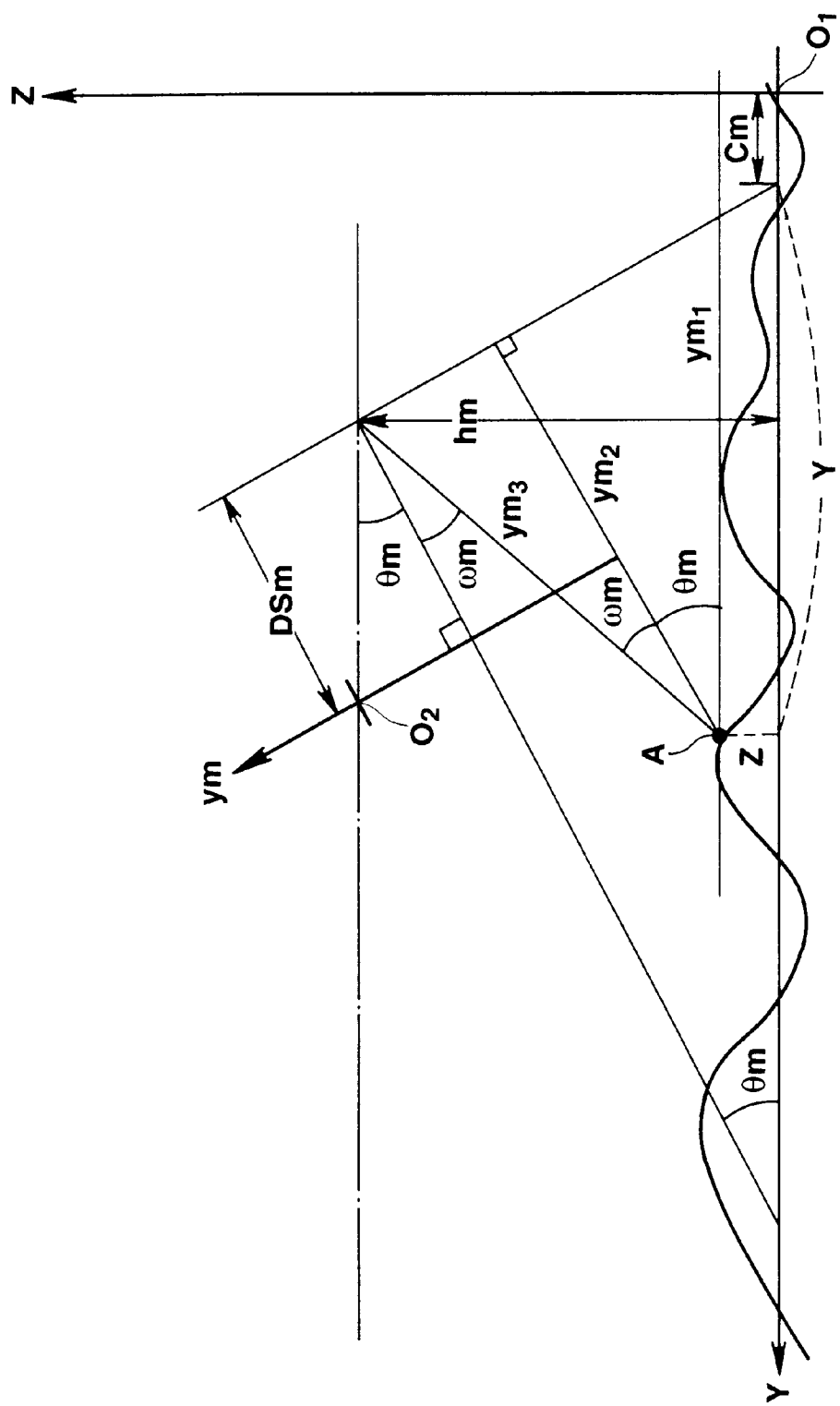
FIGS. 8 and 9 are explanatory views for explaining a relationship between the altitude coordinate inclusive three-dimensional coordinates and display coordinates in the first embodiment shown in FIG. 1A.
Figure 9:
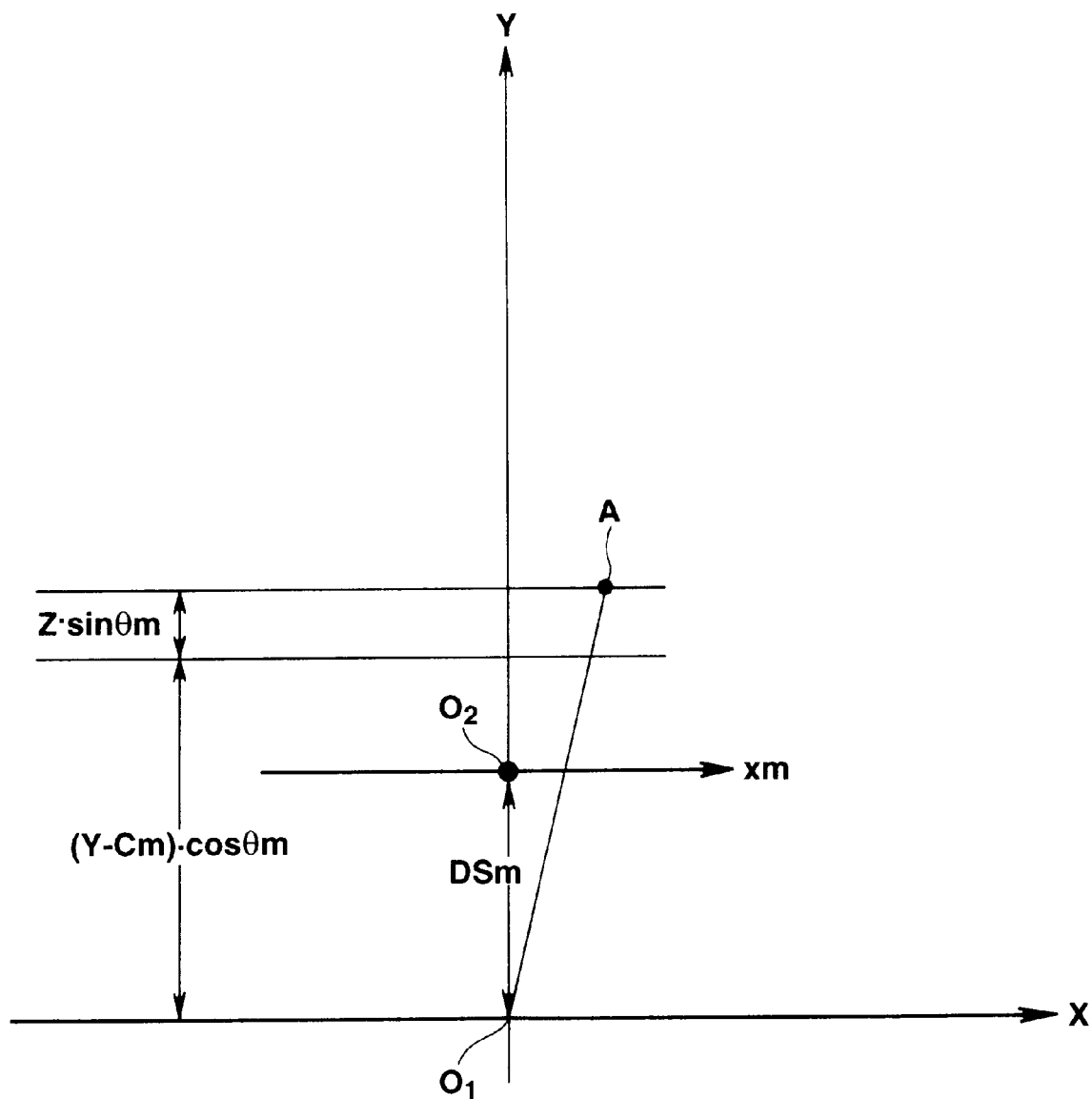

As shown in FIG. 6, when an arbitrary point A (X, Y, Z) on the three-dimensional coordinates (X, Y, Z) is transformed into a coordinate point A (xm, ym) on terrain coordinates shown in FIG. 7, the following equation (1) is established as shown in FIG. 8.

$$ym = -DSm \tan \theta m - DSm \tan \omega m = -DSm(\tan \theta m + \tan \omega m) \quad (1).$$

In addition, the coordinates of the arbitrary point A (X, Y, Z) on the (X, Y, Z) three-dimensional coordinates satisfy the following two equations as appreciated from FIG. 8.

$$Y = Cm + ym1,$$

$$ym1 \cos \theta m = ym2$$

$$ym2 = \cos \omega m \, ym3$$

$$hm - Z = ym3 \sin(\omega m + \theta m),$$

$$\therefore Y = (hm - Z)/(\sin(\theta m + \omega m))(\cos \omega m / \cos \theta m) + Cm \quad (2).$$

Hence, if the equation (2) is rearranged, the following equation (3) is given:

$$Y = (hm - Z)/(\tan \theta m + \tan \omega m)\cos^2 \theta m + Cm \quad (3)$$

Hence, the following equation (4) is established from the above-described equations (1) and (3).

$$Y = -(hm - Z)DSm/(\cos^2 \theta m \, ym) + Cm \quad (4).$$

If the above-described equation (4) is arranged, the following equation (5) is established.

$$ym = -DSm/\cos^2 \theta m(hm - Z)/(Y - Cm) \quad (5)$$

When, in the road map representation in the form of the bird's eye view, the arbitrary point A (X, Y, Z) on the three-dimensional coordinates (X, Y, Z) in FIG. 6 is transformed into the coordinate point A(xm, ym) on the display coordinates (xm, ym) in FIG. 7, the following equation (6) is given as:

$$X/((Y-Cm)\cos\theta m + Z\sin\theta m)) = xm/DSm \qquad (6).$$

If this equation (6) is rearranged, the following equation (7) is given as:

$$Xm = DSmX/((Y-Cm)\cos\theta m + Z\sin\theta m) \qquad (7).$$

The above equations (5) and (7) represent the transformation equations used to transform the perspective projection from the three-dimensional coordinates (X, Y, Z) into the terrain representation coordinates (xm, ym).

Consequently, the following two equations (8) can be given as:

$$xm = DSmX/\{(Y-Cm)\cos\theta m + Z\sin\theta m\}$$
$$ym = -DSm/(\cos^2\theta m)(hm-Z)/(Y-Cm) \qquad (8).$$

Next, at a step S103 in FIG. 5, road link data included in the three-dimensional road map information but stored in other memory locations from the topographic map data (terrain data) are transformed from the three-dimensional coordinates into the road map display coordinates.

Subsequently, at a routine A of a step S104, the CPU 12A, viz., the calculation processing device 12 generates the stereoscopic (terrain) display data from the three-dimensional coordinate data.

At a routine B of a step S105, the CPU 12A of the calculation processing device 12 generates the terrain drawing data.

According to a conditional branch at a step S106, the steps S103 through S105 are repeated until the drawing data generation for all of the altitude coordinate data are ended.

In the first embodiment of the method for stereoscopically displaying the topographic road map, a process A-1 shown in the detailed flowchart of FIG. 10 is carried out.

Figure 12:
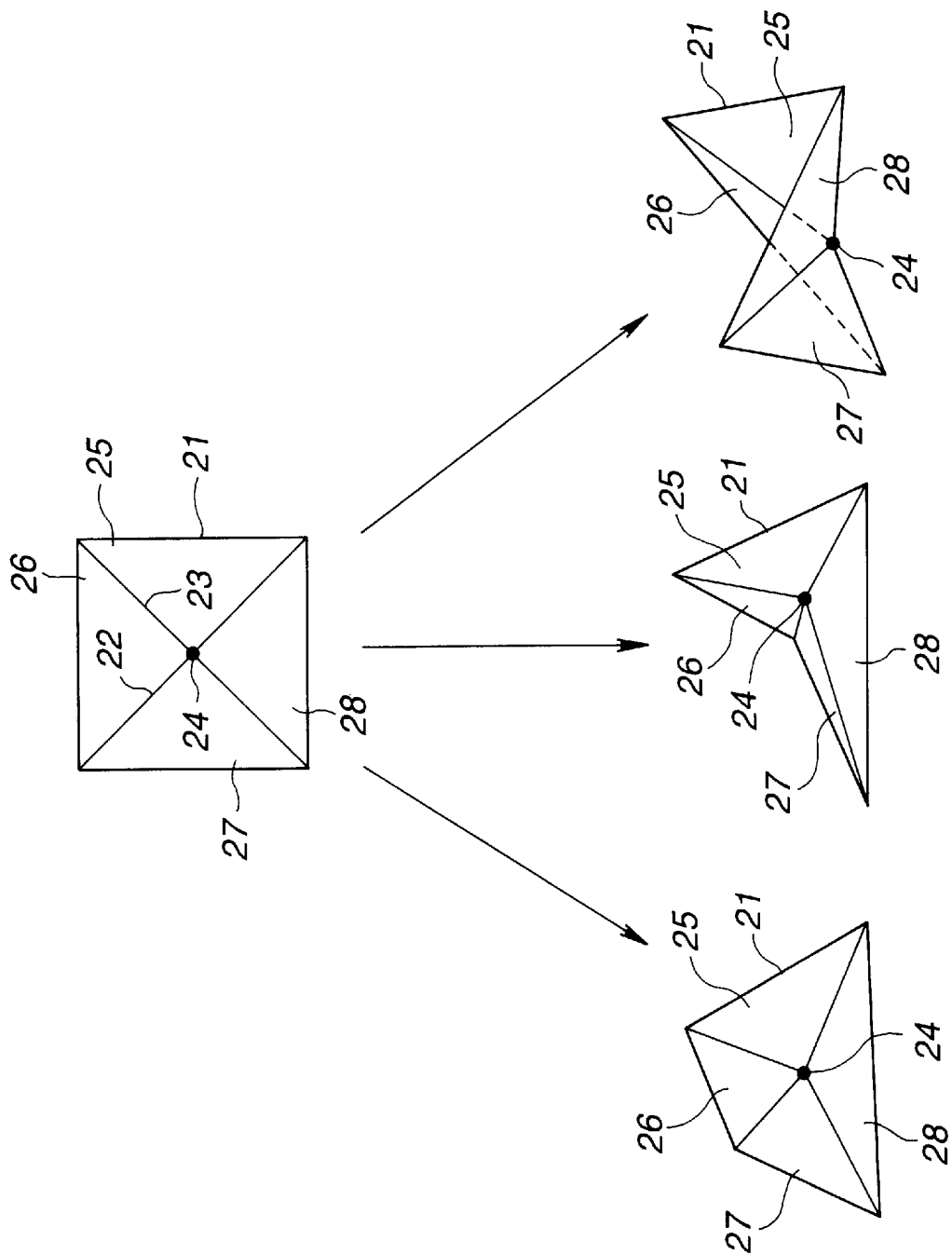
FIG. 12 is an explanatory view for explaining a diagram of each virtually formed (generated) quadrilateral into triangular elements.

At a step S201 of FIG. 8, the CPU 12A, viz., the calculation processing device 12 sets a quadrilateral 21 with four mutually adjoining data as vertices as shown in an upper part of FIG. 12.

At the next step S202, the CPU 12A, viz., the calculation processing device 12 draws two diagonal lines 22 and 23 for the set quadrilateral 21 and determines an intersection as a middle point 24.

At the next step S203, the CPU 12A, viz., the calculation processing device 12 calculates the altitude coordinate of the middle point 24 by, e.g., the altitude coordinate data of the four vertices forming the set quadrilateral.

Next, the quadrilateral 21 is divided into four triangle elements 25, 26, 27, and 28 with each diagonal line 22 and 23 as a boundary.

The CPU 12A, viz., the calculation processing device 12 derives the multiple number of triangular elements 25, 26, 27, and 28, each triangle element having the altitude data of the middle point 24 and the adjoining two vertices at a step S204.

Hence, as shown in a lower part of FIG. 12, various shapes of solid geometric forms (stereographic configuration) can be generated according to the divided four triangular elements 25, 26, 27, and 28 according to the difference in the altitude data of the four vertices with respect to a single quadrilateral element 21.

For the topographic terrain display data by means of the four triangular elements 25, 26, 27, and 28 generated at the routine A, a color processing by means of a routine B-1 shown in the flowchart of FIG. 11 is carried out to achieve a final drawing data.

That is to say, at a step S301 of FIG. 11, a display color is allocated to each triangle element 25, 26, 27, and 28 generated in the above-described processing A-1 according to the altitude data of, e.g., the middle point described above or a representative vertex of each triangle element 25, 26, 27, and 28 using a color function.

Referring back to FIG. 5, the step of S301 is repeated until all read altitude data are processed (at the step S106).

Figure 13:
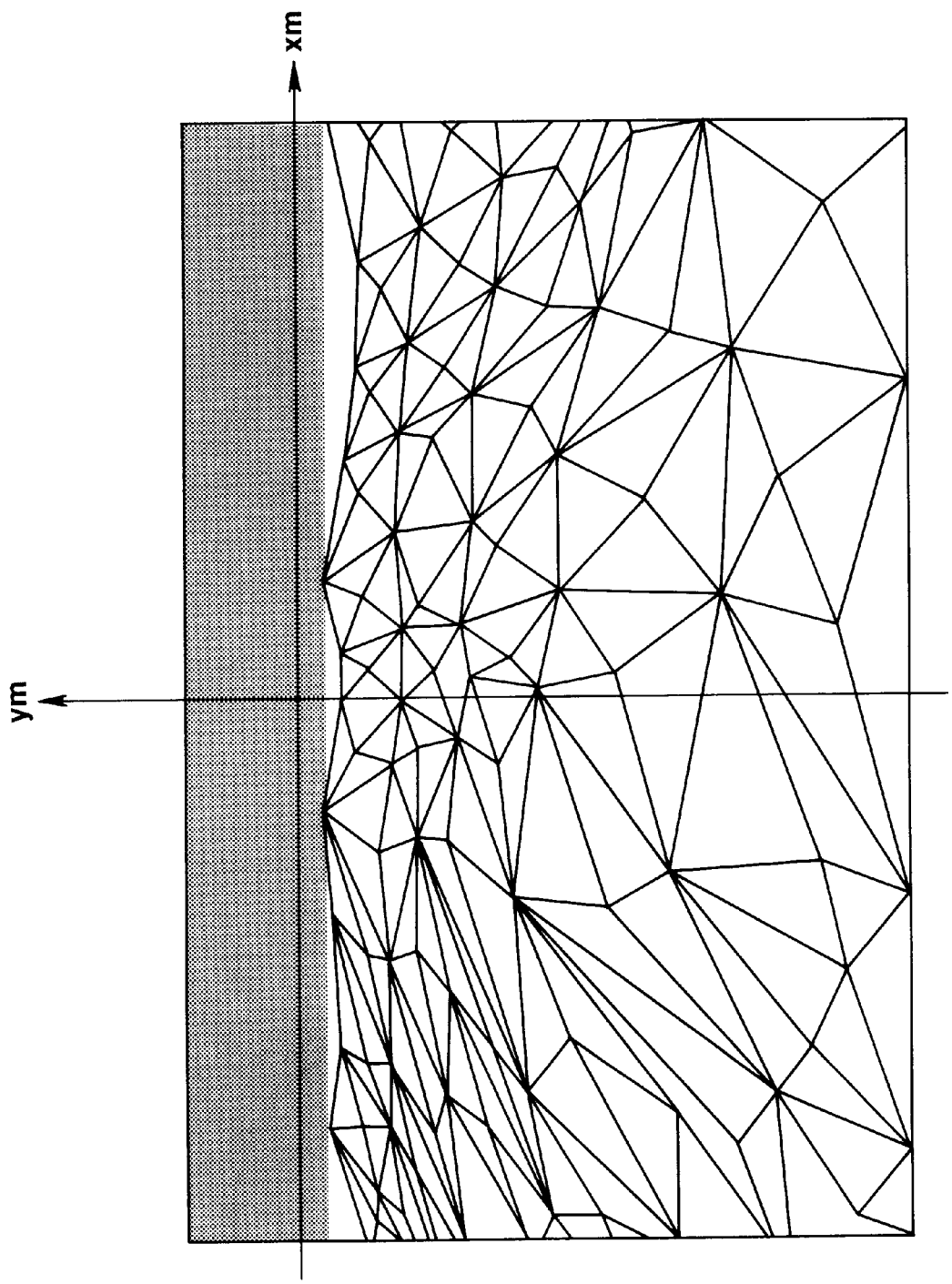
FIG. 13 is an explanatory view representing an example of a topographic representation carried out in the first embodiment shown in FIG. 1A.

Consequently, the bird's eye view representation generated by the method for stereoscopically displaying the topographic road map in the first embodiment and displayed on the image screen of the display unit 13 are shown in FIG. 13.

Figure 2A:
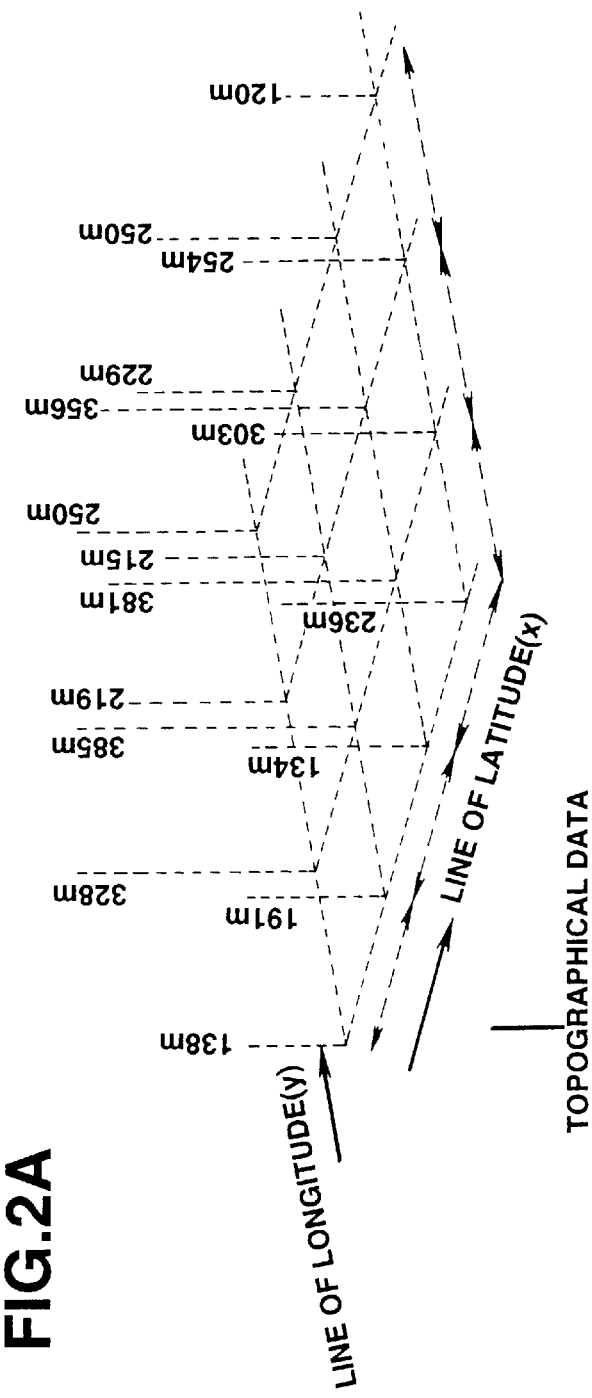
FIGS. 2A and 2B are examples of topographic data stored in a recording medium such as a CD-ROM shown in FIG. 1A.
Figure 2B:
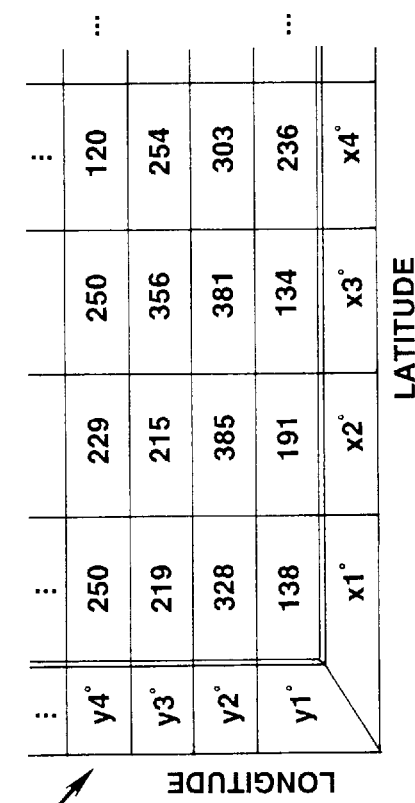

It is noted that FIGS. 2A and 2B show integrally altitude data stored in a data base such as the recording medium inserted into its corresponding recording device and the altitude data for each actually longitude-and-latitude coordinate point as shown in FIG. 2A is stored in a data matrix table format as shown in FIG. 2B.

That is to say, an actual altitude value at each point arrayed in a grid (lattice) point at a constant interval in a horizontal plane direction, viz., in each direction of lines of longitude (y) and latitude (x) is stored in the data matrix table format as shown in FIG. 2B.

Hence, the four vertices of each quadrilateral can be generated by four mutually adjoining altitude values stored in the data matrix table format.

Figure 3:
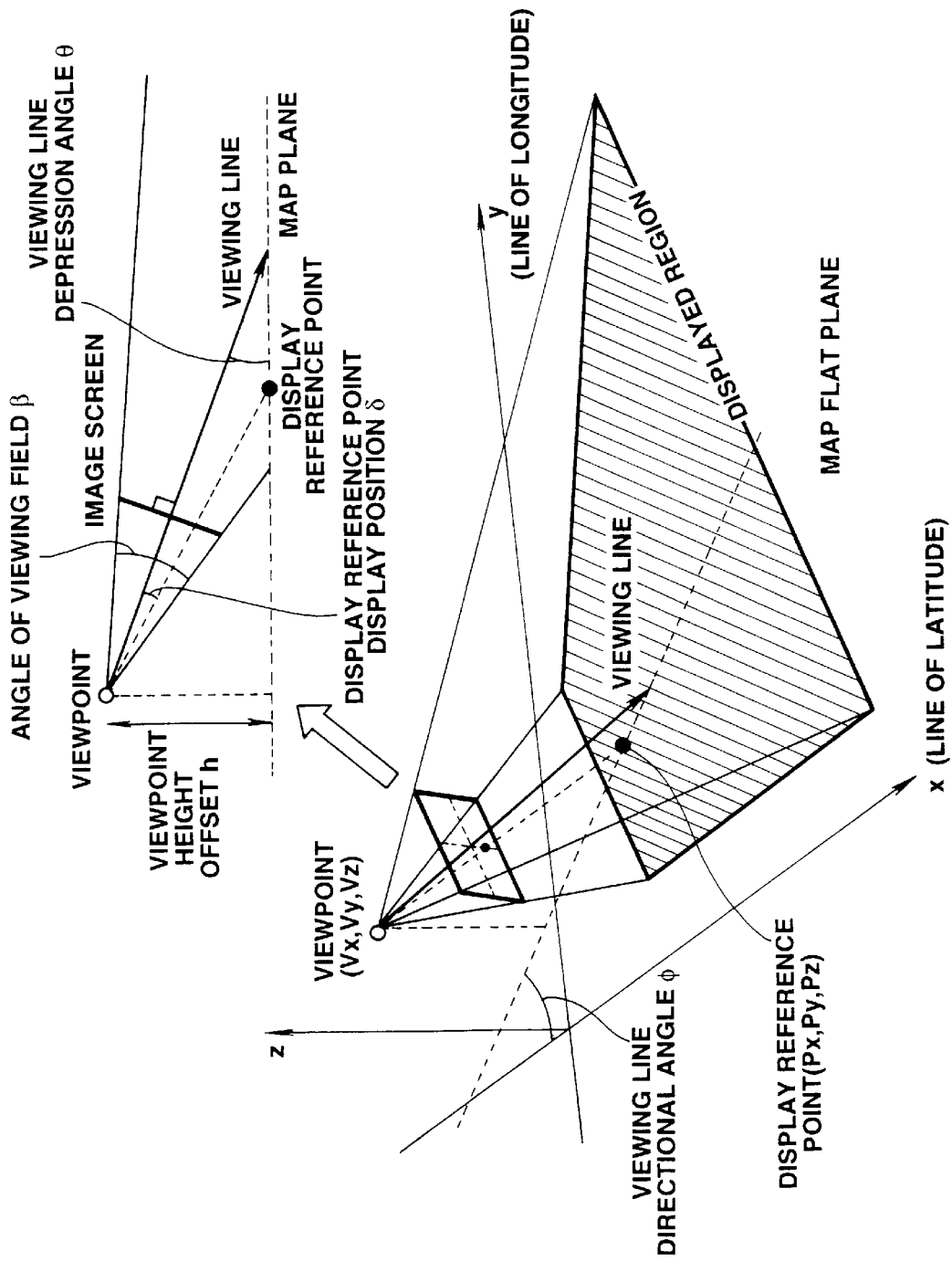
FIG. 3 is an explanatory view for explaining a topographic map display in a perspective projection transformation.

FIG. 3 shows a positional relationship between the viewpoint of the bird's eye view, a display reference point, and the region of the road map to be displayed (displayed region).

Suppose that the region of the road map to be displayed can be specified by the two-dimensional coordinate system (x, y) corresponding to the lines of latitude and longitude irrespective of the altitude values of the terrain data in the region to be displayed.

In the case of FIG. 3, the horizontal plane having the same altitude value as the display reference point is supposed to be the road map plane. If a height h of the viewpoint coordinate is described by an offset value h, the positional relationship shown in FIG. 3 is always established irrespective of the height so that the region of the road map to be displayed can be specified.

That is to say, if the two-dimensional positional coordinates (Px, Py) except the altitude value of the display reference point and an angle $\phi$ in the direction of a line of sight (a viewing line) are inputted from, e.g., the operation device 14, the region of the road map to be displayed (hatched portion named displayed region in FIG. 3) can be determined using the depression angle of the viewing line θ, the angle of field of view β, and the display reference point displayed position δ.

The above-described determined displayed region shown in FIG. 3 and altitude data of each vertex shown in FIGS. 2A and 2B are exemplified by a U.S. patent application Ser. No. 09/099,188 (the disclosure of which is herein incorporated by reference).

(Second Embodiment)

FIGS. 14 through 18 show a second preferred embodiment of the method for stereoscopically displaying the topographic road map according to the present invention.

Figure 14:
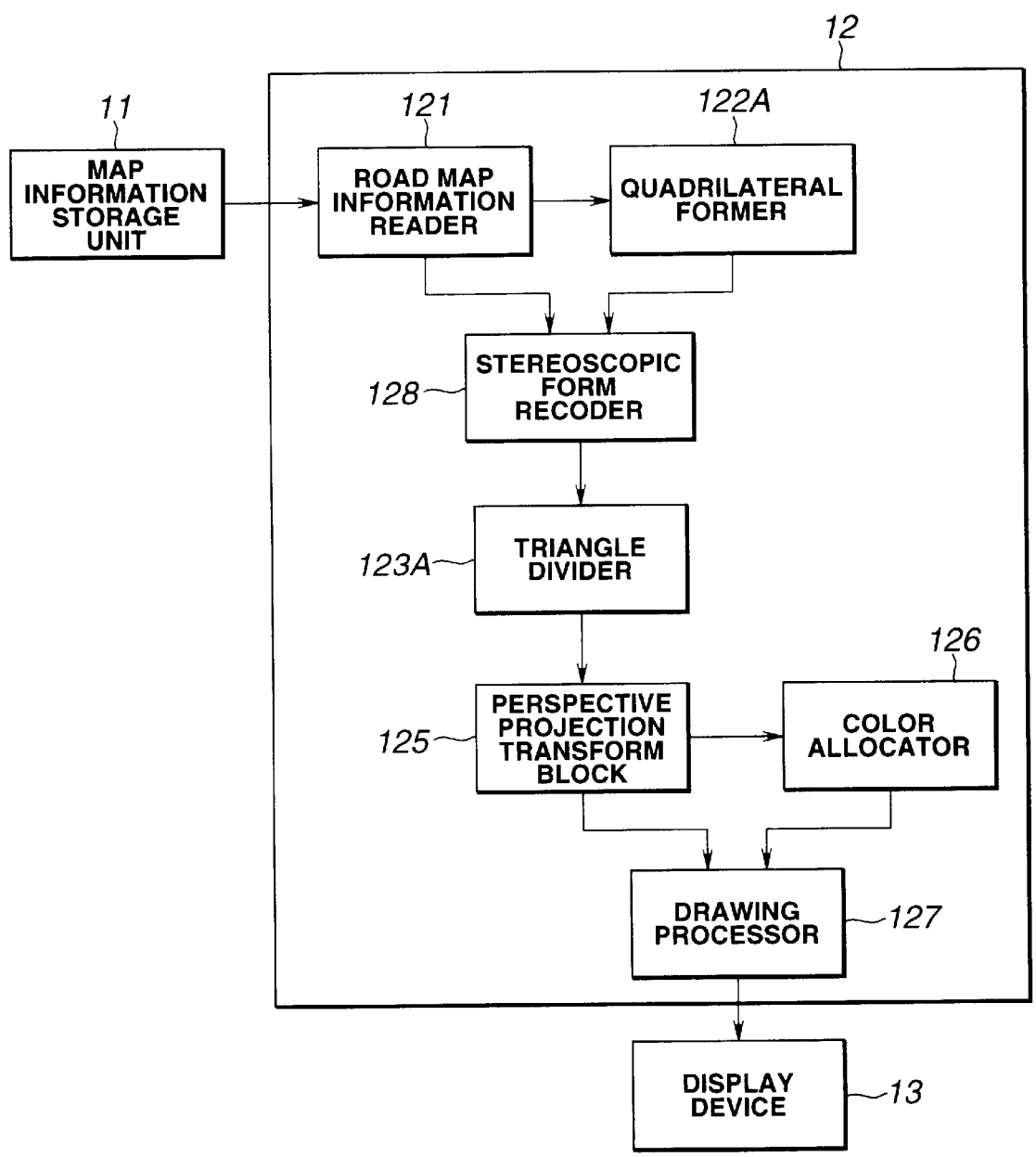
FIG. 14 is a schematic circuit block diagram representing the calculation processing device executing a second preferred embodiment of the method for stereoscopically displaying the topographic map.
Figure 15:
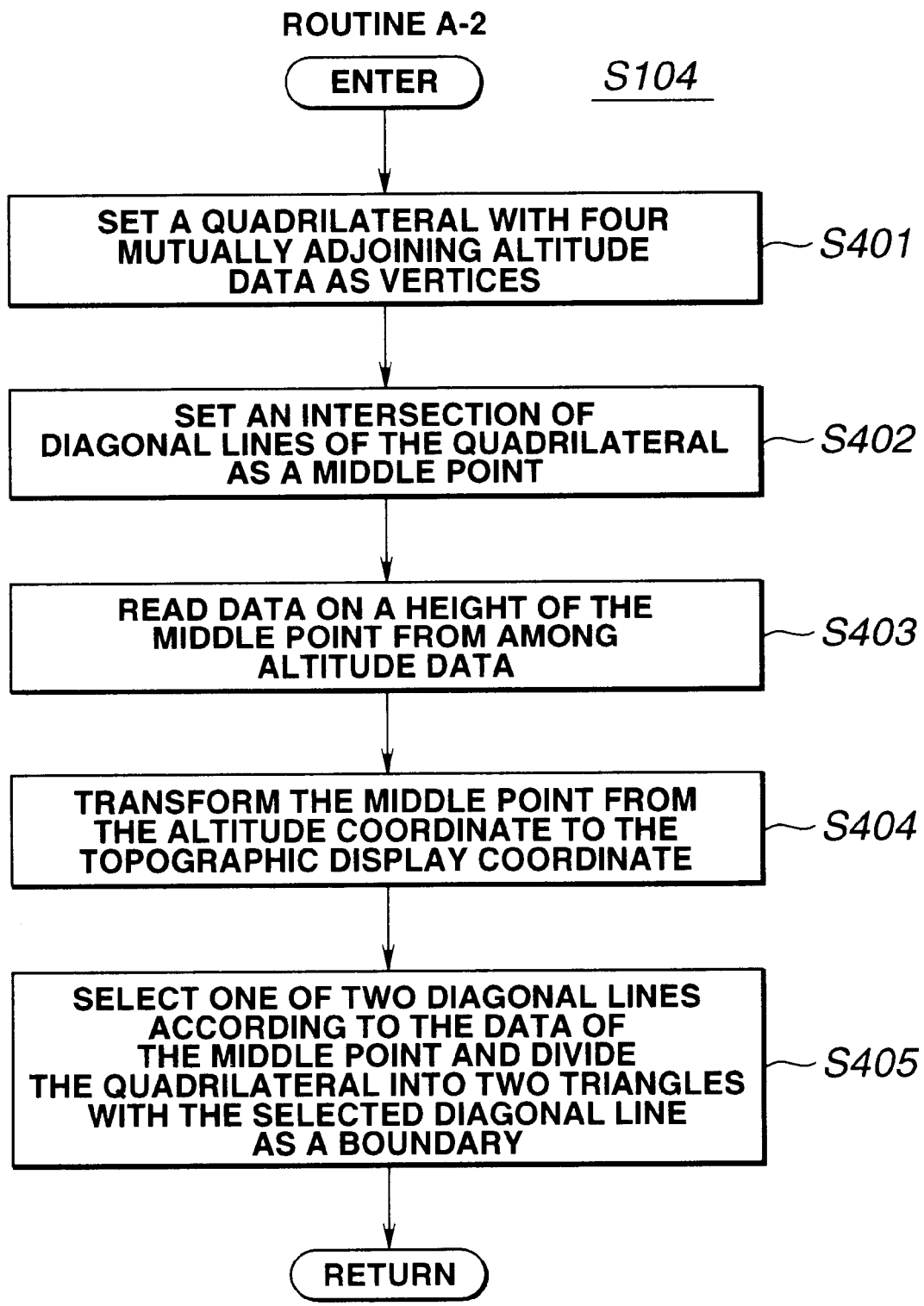
FIG. 15 is an operational flowchart of the routine A as a routine A-3 in the second embodiment shown in FIG. 14.

In the second embodiment, a procedure of the method of displaying stereoscopically topographic map in the first embodiment shown in FIG. 5 is executed, the processing routine of A-2 shown in the flowchart of FIG. 15 is executed as the corresponding routine A of the step S104 described in the first embodiment, and the hardware structure is the same as the first embodiment, FIG. 14 shows a functional block diagram of the calculation processing device 12 in the case of the second embodiment.

That is to say, the calculation (arithmetic/logic operation) processing device 12 functionally includes: road map information reading block 121 for reading the three-dimensional road map information belonging to the predetermined road map region to be displayed; the quadrilateral former 122A for virtually forming (generating) the multiple number of quadrilaterals with mutually adjoining four points of locations as vertices; a stereoscopic form recorder 128 for reading altitude data of the four vertices of the multiple number of quadrilaterals formed (generated) by the quadrilateral former 122A from the three-dimensional road map information belonging to the predetermined road map region to be displayed and recording a stereoscopic form (or so-called, a solid figure) of each quadrilateral on the basis of the respective altitude data; a triangular element divider (triangle divider) 123A for selecting one of the two diagonal lines formed in each quadrilateral recorded by the stereoscopic form recorder 128 according to the stereoscopic form of the corresponding one of the quadrilaterals and connecting the selected one of the diagonal lines between its corresponding two vertices to divide each quadrilateral into two triangles; the perspective projection transformation (transform) block 125 for performing the perspective projection transformation of the vertices of each triangle on the given projection plane with the given position as the origin thereof; the color allocator 126 for allocating a display color into each triangle perspective projection transformed by means of the perspective projection transformer 125; and the drawing processor 127 for displaying the allocated display colors together with each triangle on the image screen of the display unit 13.

Figure 16:
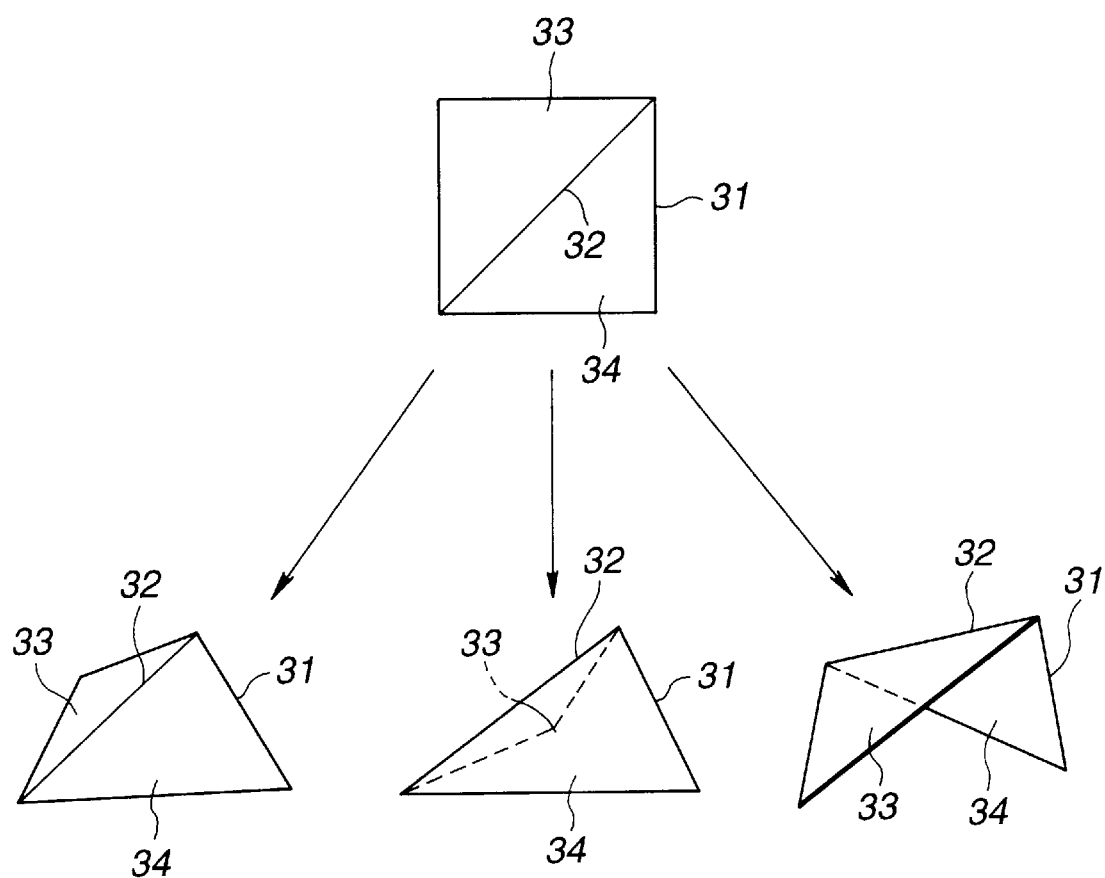
FIG. 16 is an explanatory view for explaining the division of each virtually formed (generated) quadrilateral into triangular elements in the second embodiment shown in FIG. 14.
Figure 17:
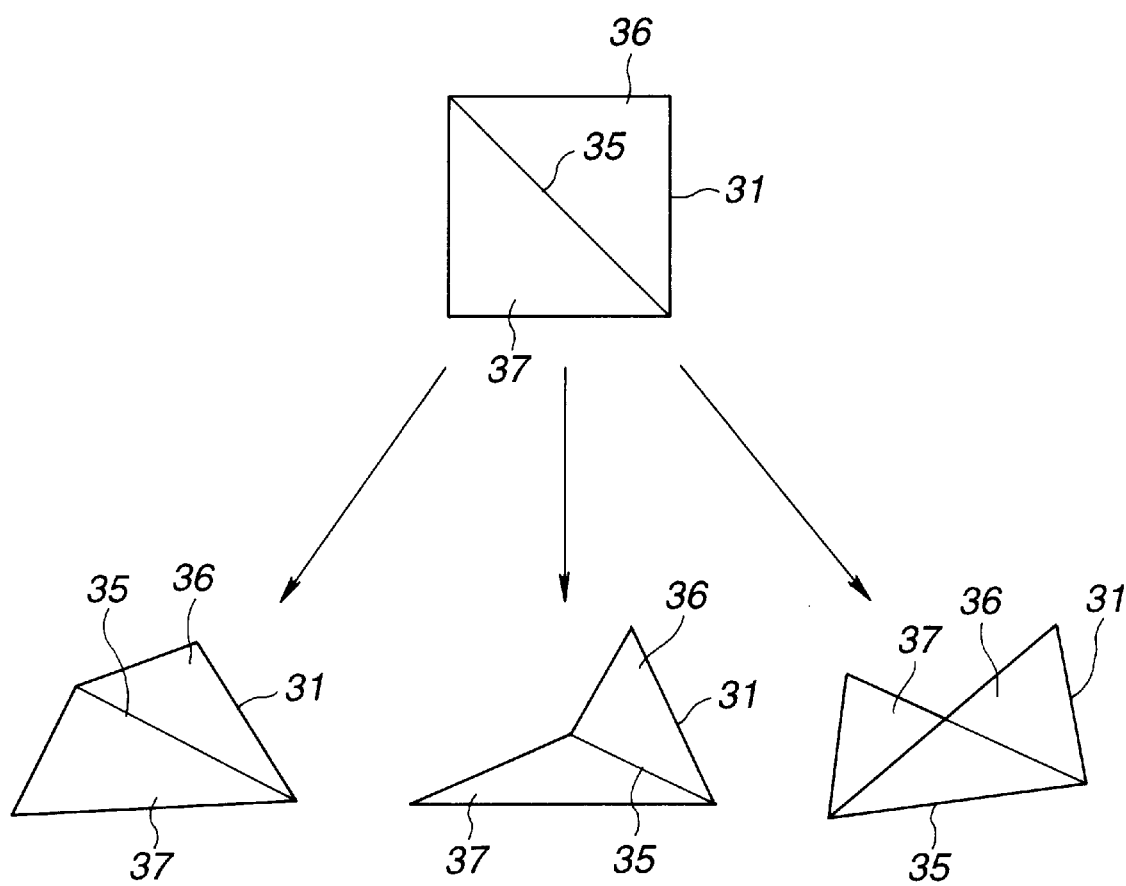
FIG. 17 is an explanatory view for explaining another division of each virtually formed quadrilateral into the triangular elements in the second embodiment shown in FIG. 14.

In the processing routine A-2 shown in FIG. 15 executed by the calculation processing device 12, the CPU 12A of the navigation system, viz., the calculation processing device 12 virtually generates (forms) each one of quadrilaterals 31 with four mutually adjoining altitude data as the vertices, as shown in each upper part of FIGS. 16 and 17, for the three-dimensional altitude data at the predetermined grid (lattice) interval (also, called at the predetermined sampling point) (as shown in FIGS. 2A and 2B) belonging to the specified map region to be displayed on the memory such as the RAM 12C shown in FIG. 1B so that the corresponding terrain is rearranged into a collection of quadrilateral elements (at a step S401).

Next, the CPU 12A of the navigation system, viz., the calculation processing device 12 draws virtually the two diagonal lines 22 and 23 for each generated quadrilateral 31 and assigns its intersection into the middle point of each generated quadrilateral at a step S402.

At the next consecutive steps S403 and S404, the CPU 12A of the navigation system, viz., the calculation processing device 12 reads the altitude coordinate of the middle point and transforms the altitude coordinate of the middle point into the terrain display coordinate.

At the next step S405, the CPU 12A of the navigation system (the calculation processing device 12) selects one of the two diagonal lines used to derive the middle point according to the transformed terrain display coordinate data of the derived middle point and divides the original quadrilateral into two triangular elements with the selected diagonal line as a boundary.

For example, as shown in the upper part of FIG. 16, if the one diagonal line 32 is selected for the quadrilateral 31, the quadrilateral 31 is divided into two triangle elements 33 and 34, thus three types of the stereoscopic form data as shown in lower parts (arrow marked directions) of FIG. 16 being obtained for the respective two triangular elements 33 and 34 each according to the altitude data of the three vertices of the respective two triangular elements 33 and 34.

In addition, as shown in the upper part of FIG. 17, if the other diagonal line 35 is selected for the corresponding quadrilateral 31, the calculation processing device 12 divides the quadrilateral 31 into two triangular elements 36 and 37, thus three types of stereoscopic form data as shown in the lower three parts (arrow marked directions) of FIG. 17 being obtained for the respective two triangular elements 36 and 37 each according to the altitude data of the three vertices of the respective two triangular elements 36 and 37.

As the processing routine A with respect to the single quadrilateral 31 now processed, the detailed processing routine of A-2 is executed. After the division of the corresponding quadrilateral into the triangular elements and the stereoscopic form data are obtained, the processing routine of B-1 shown in FIG. 10 is executed as the routine of the step S105 in the same way as the first embodiment and the display color is allocated to each triangular element on the basis of the representative altitude data of each triangular element.

For all read altitude data, the processing in accordance with the flowchart of FIG. 5 is repeated until the condition described at the step S106 is satisfied.

Figure 18:
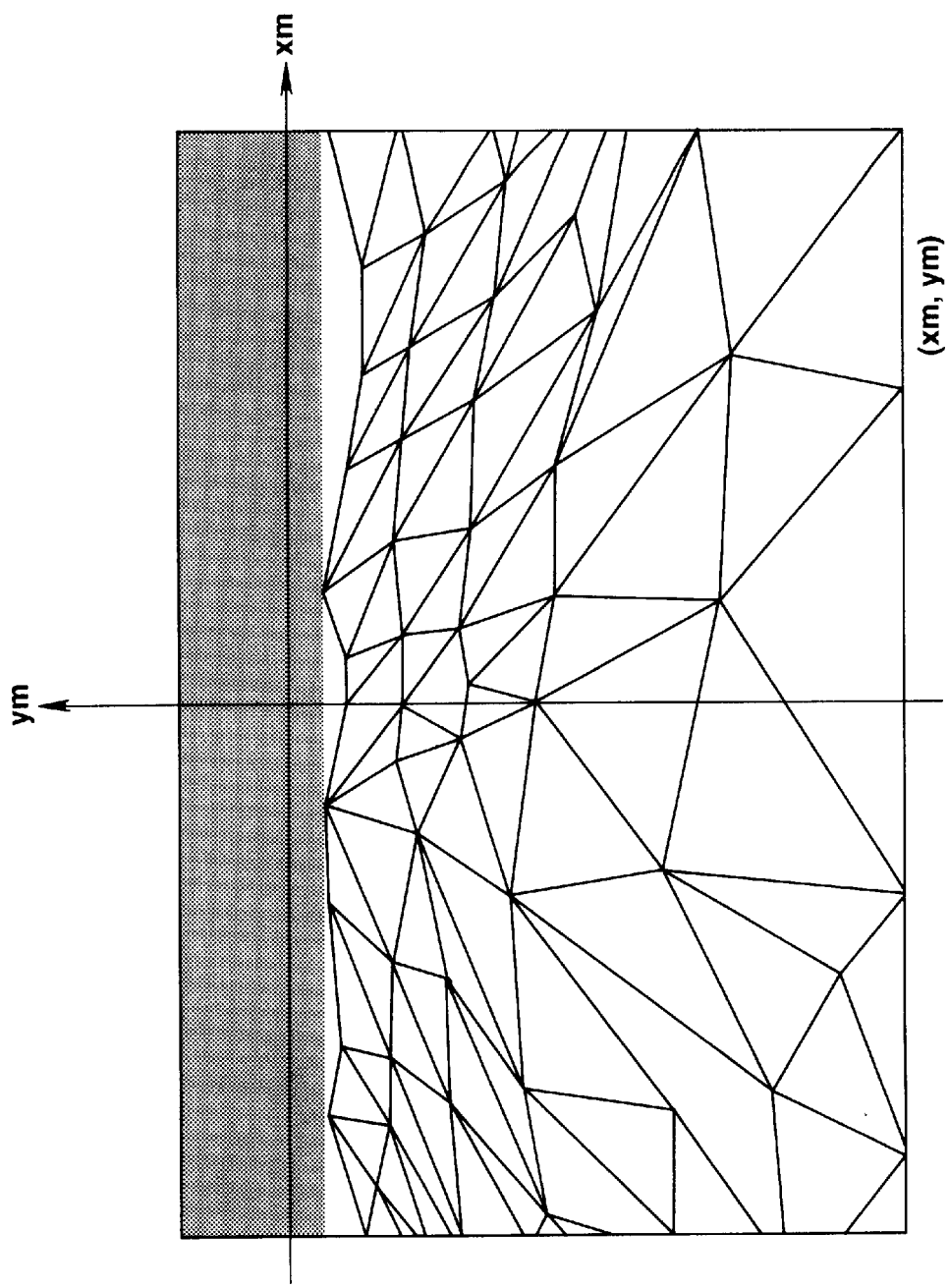
FIG. 18 is an explanatory view for explaining an example of the topographic representation carried out in the second embodiment shown in FIG. 14.

FIG. 18 shows an example of the bird's eye view on the stereoscopic terrain data displayed on the image screen of the display unit 13 generated by the method in the second embodiment.

In the second embodiment, the number of the triangular elements to represent the stereoscopic topographic map is approximately half as compared with that in the case of the first embodiment, the quantity of calculations is accordingly reduced, and the display speed can accordingly be faster.

(Third Embodiment)

Figure 19:
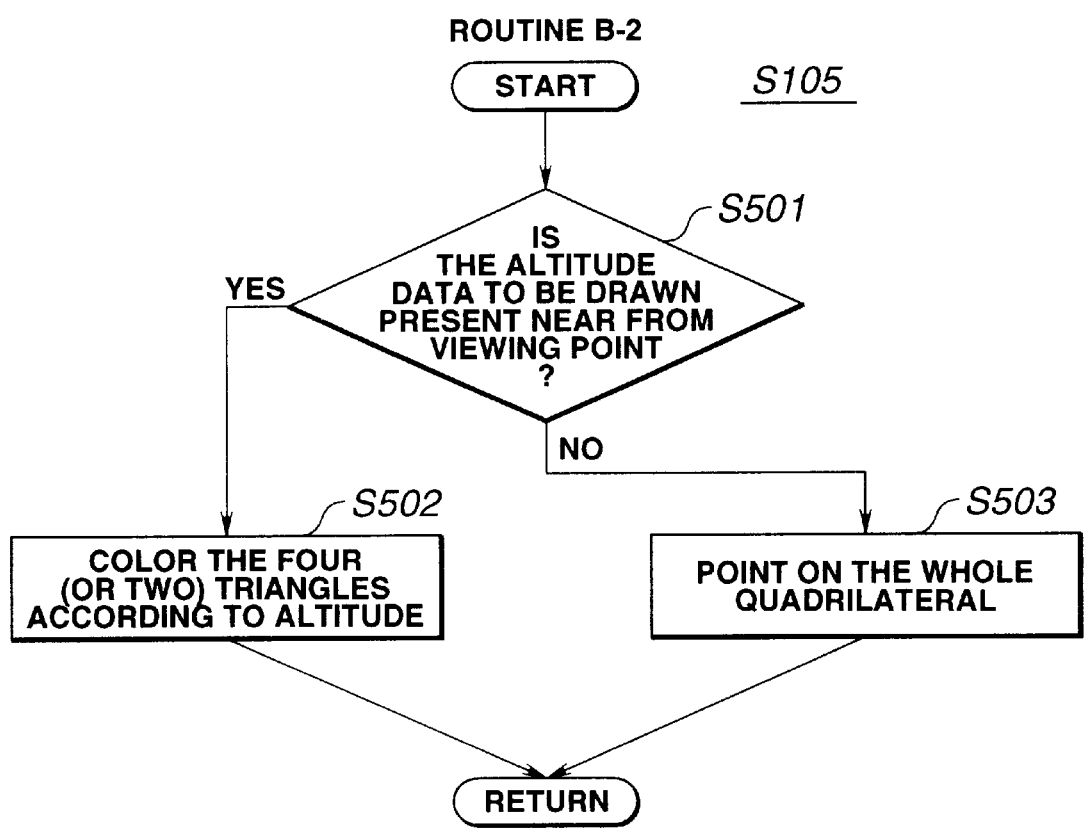
FIG. 19 is an operational flowchart of the routine B as a routine B-2 in a third preferred embodiment according to the present invention.
Figure 20:
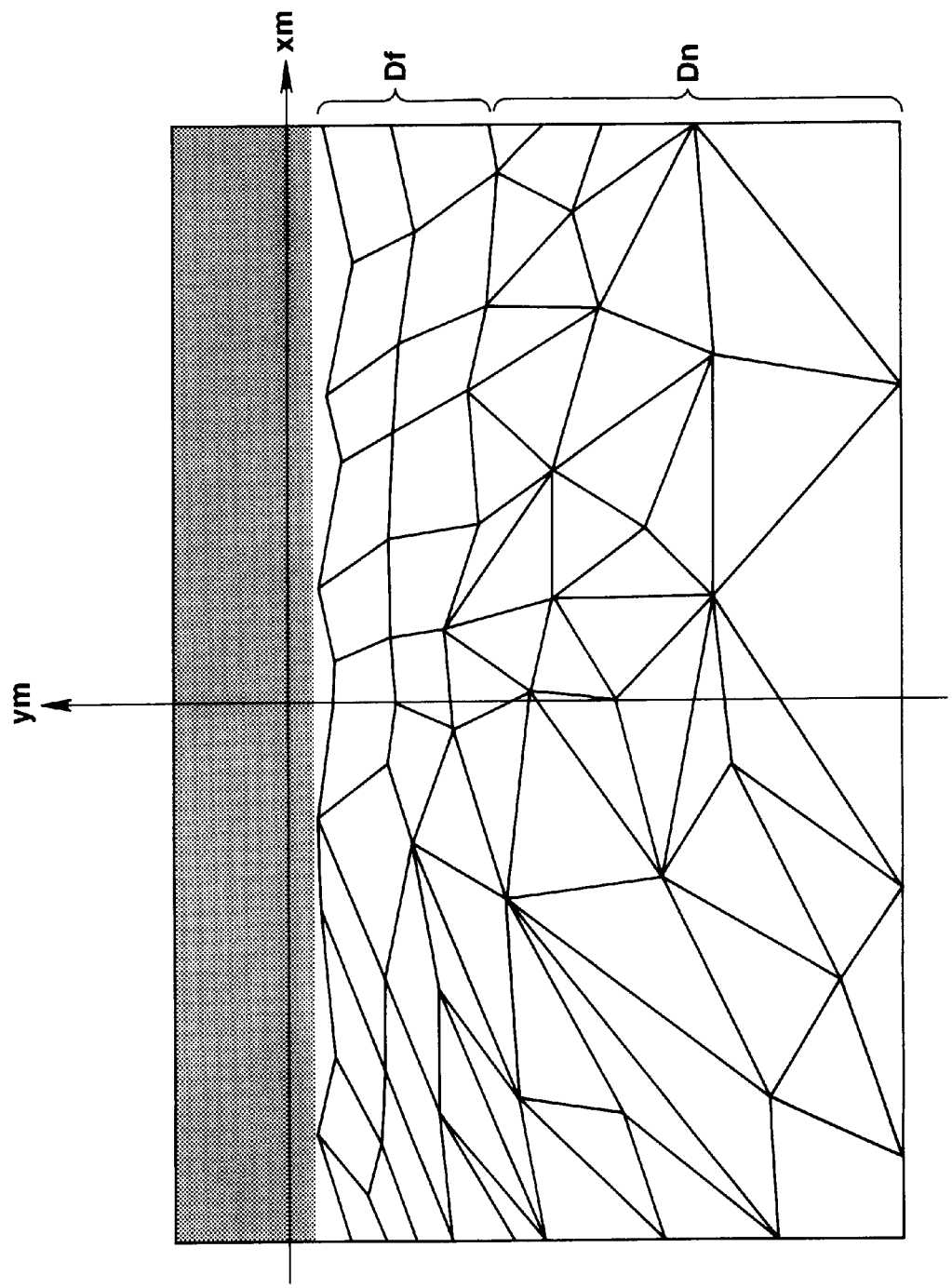
FIG. 20 is an explanatory view representing an example of the stereoscopically topographic representation in the third embodiment.

FIGS. 19 and 20 show a third preferred embodiment of the method for stereoscopically displaying the topographic road map according to the present invention.

In the third embodiment of the method for stereoscopically displaying the topographic map, a detailed processing routine of B-2 shown in FIG. 19 is executed in place of the detailed processing routine of B-1 shown in FIG. 11 as the routine B at the step S105 described in the flowchart shown in FIG. 5 in the case of either the first or second embodiment. The other hardware structure and other procedures in the third embodiment are the same as those described in the first embodiment.

In the processing routine of B-2 shown in FIG. 19, the CPU 12A of the navigation system, viz., the calculation processing device 12 determines whether the altitude data to be drawn belongs to one region in a short distance within a prescribed limit from the viewpoint (hereinafter, referred to as a short-distance region Dn) or belongs to the other region in a long distance outside the prescribed limit and selects one of the methods of drawing such polygons as described above according to a distance of the altitude data from the viewpoint.

Hence, at a step S501 of FIG. 19 (detailed processing routine of B-2), the CPU 12A of the navigation system, viz., the calculation processing device 12 determines whether a position of one of the triangular elements obtained at the routine A (the step S104 of FIG. 5) on the topographical map belongs to the short-distance region Dn within the prescribed limit from the viewpoint or belongs to the long-distance Df outside the prescribed limit from the viewpoint.

If it belongs to the short-distance region (YES) at the step S501, the calculation processing device 12 allocates the display color to each of the four triangular elements obtained at the routine A (in the case of the detailed processing routine of A-1 shown in FIG. 10 or to each of the two triangular elements obtained at the routine A (in the case of the detailed processing routine of A-2 shown in FIG. 15) according to the altitude data on the respectively corresponding triangular elements.

On the other hand, if it belongs to the long-distance region Df (NO) at the step S501, the routine goes to a step S503 in which the CPU 12A of the navigation system, viz., the calculation processing device 12 allocates the single display color into the whole corresponding original quadrilateral according to the altitude data thereof.

Then, the CPU 12A of the navigation system, viz., the calculation processing device 12 executes the processing routine of either A-1 or A-2 as the routine A and executes the processing of B-2 as the routine B for all read altitude data (refer to the step S106 of FIG. 5).

FIG. 20 shows an example of the bird's eye view representation of the stereoscopic topographic map generated in the third embodiment and displayed on the image screen of the display unit 13.

As shown in FIG. 20, in the third embodiment, the single color is allocated to each quadrilateral element, for the altitude data at each position within the long-distance region Df from the viewpoint and, only for the altitude data at each position within the short-distance region Dn, the display colors are allocated to the respective triangular elements.

Consequently, the quantity of graphic data can be reduced, the display speed can accordingly be faster.

(Fourth Embodiment)

FIGS. 21, 22, 23, and 24 show a fourth preferred embodiment of the method for stereoscopically displaying the topographic map according to the present invention.

Figure 22:
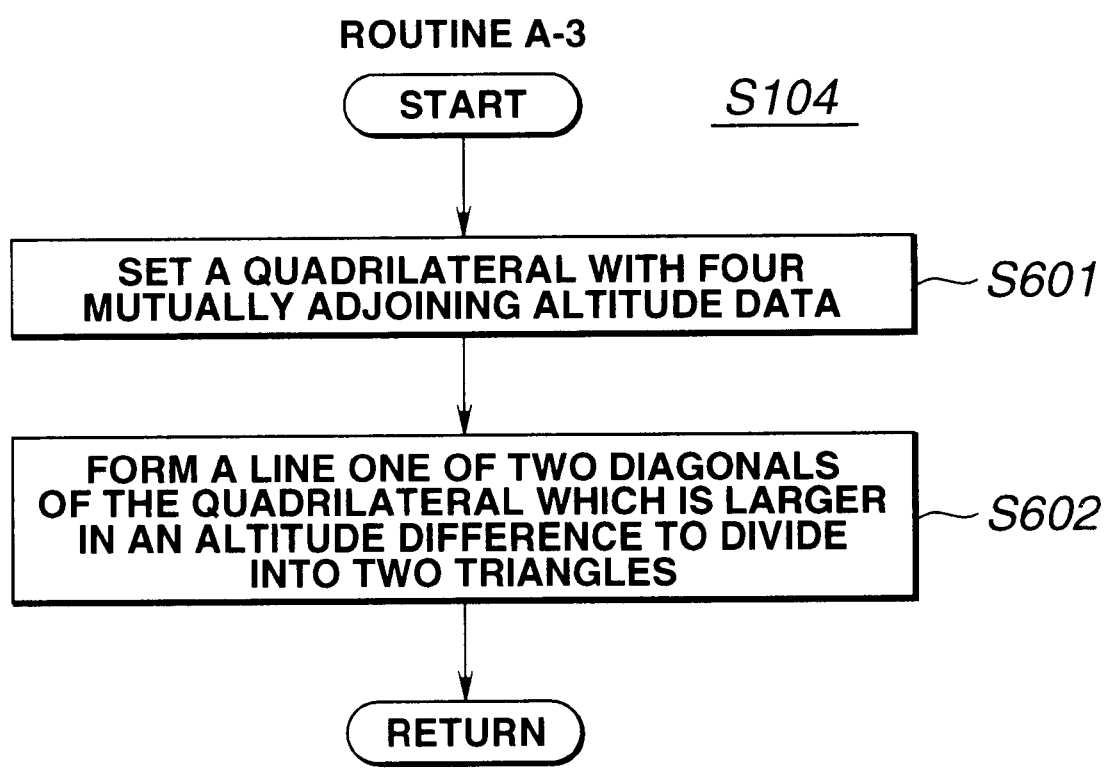
FIG. 22 is a detailed flowchart of the routine A as a routine A-3 in the fourth embodiment shown in FIG. 21.

In the fourth embodiment, as the routine A at the step S104 shown in FIG. 5, a detailed processing routine of A-3 shown in FIG. 22 is executed in the fourth embodiment. The hardware structure in the fourth embodiment is the same as that in the first embodiment.

Figure 21:
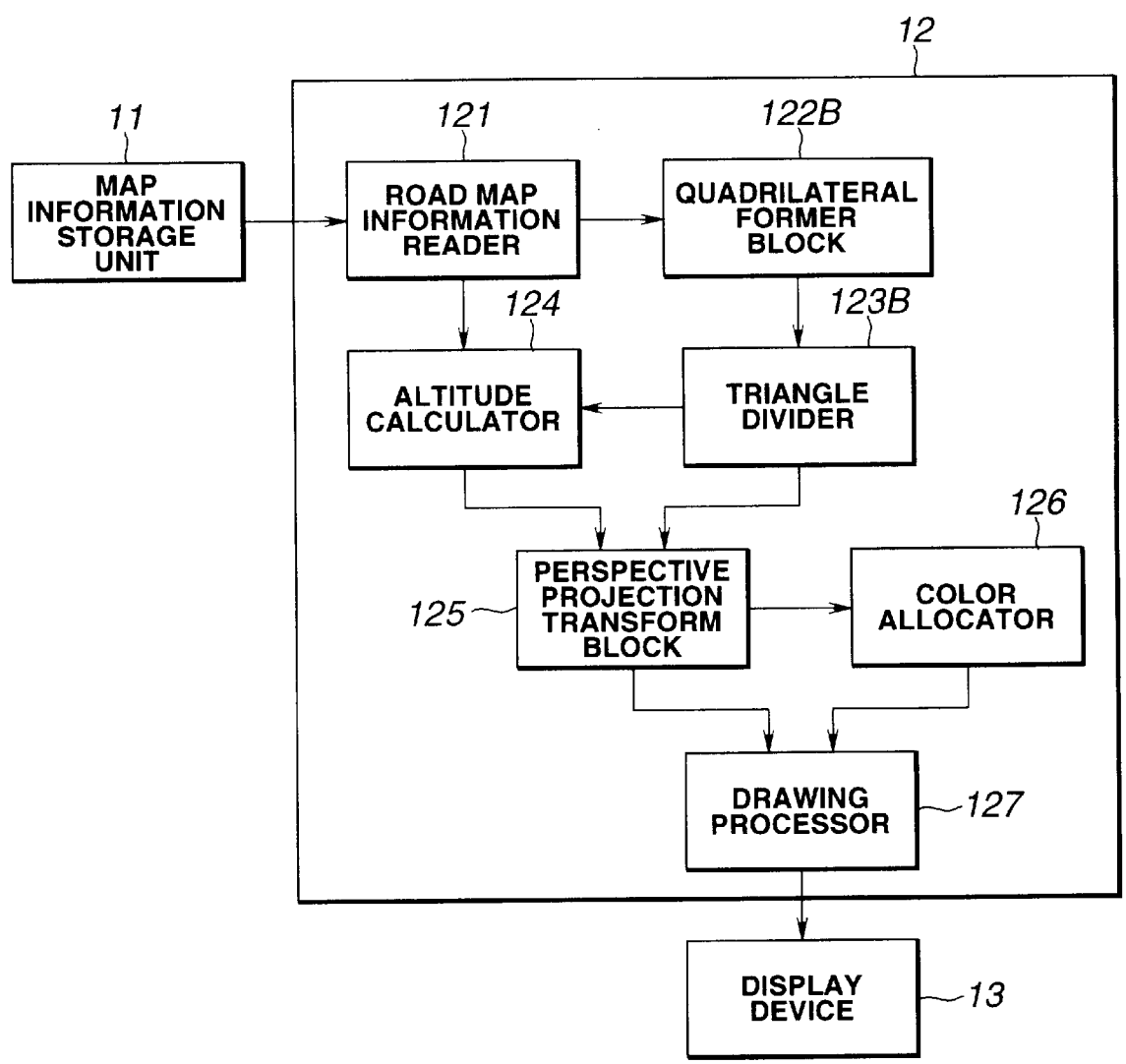
FIG. 21 is a schematic functional block diagram of the calculation processing device in a fourth preferred embodiment according to the present invention.

FIG. 21 shows functional block diagram of the calculation processing device 12 in the case of the fourth embodiment.

The calculation processing device 12 functionally includes: the road map information reader 121 for reading the three-dimensional road map information belonging to the predetermined road map region to be displayed from the map information storage unit 11; the quadrilateral former 122B for virtually forming the multiple number of quadrilaterals with the mutually adjoining four points of locations as vertices from the read three-dimensional road map information belonging to the predetermined road map region to be displayed; the triangle divider 123B for selecting one of the diagonal lines whose altitude difference between the corresponding two vertices is larger than the other for each of the quadrilaterals virtually generated by the quadrilateral former 122B, connecting the selected one of the diagonal lines and dividing each of the quadrilaterals into two triangles;

the perspective projection transformation (transform) block 125 for performing the perspective projection transformation for the vertices of each triangle; the color allocator 126 for allocating the display color to each of the perspectively projected triangles; and the drawing processor 127 for displaying the allocated display colors together with each triangle on the image screen of the display unit 13.

In the detailed processing routine of A-3 shown in FIG. 22, the calculation processing device 12 virtually generates each of the quadrilaterals with the mutually adjoining four altitude data at the predetermined grid (lattice) interval of the specified road map region to be displayed (refer to FIGS. 2A and 2B) so that the terrain (topographic map) is rearranged into the collection of the quadrilaterals at a step S601 in FIG. 22.

Next, at a step S602, the calculation processing device 12 compares the altitude differences between the corresponding two couples of the vertices in the diagonal line relationships, namely, compares one altitude difference between the two vertices of each quadrilateral to which the corresponding one of the two diagonal line is to be connected with the other altitude difference between the other two vertices of the corresponding one of the quadrilaterals to which the other diagonal line is to be connected, connects the corresponding diagonal line between one couple of the vertices whose altitude difference is larger than the other couple thereof, divides the corresponding quadrilateral into the two triangular elements by the connected diagonal line, and transforms the respective three vertices of each triangular element into the terrain display coordinates to derive the stereoscopic topographic data.

Figure 23:
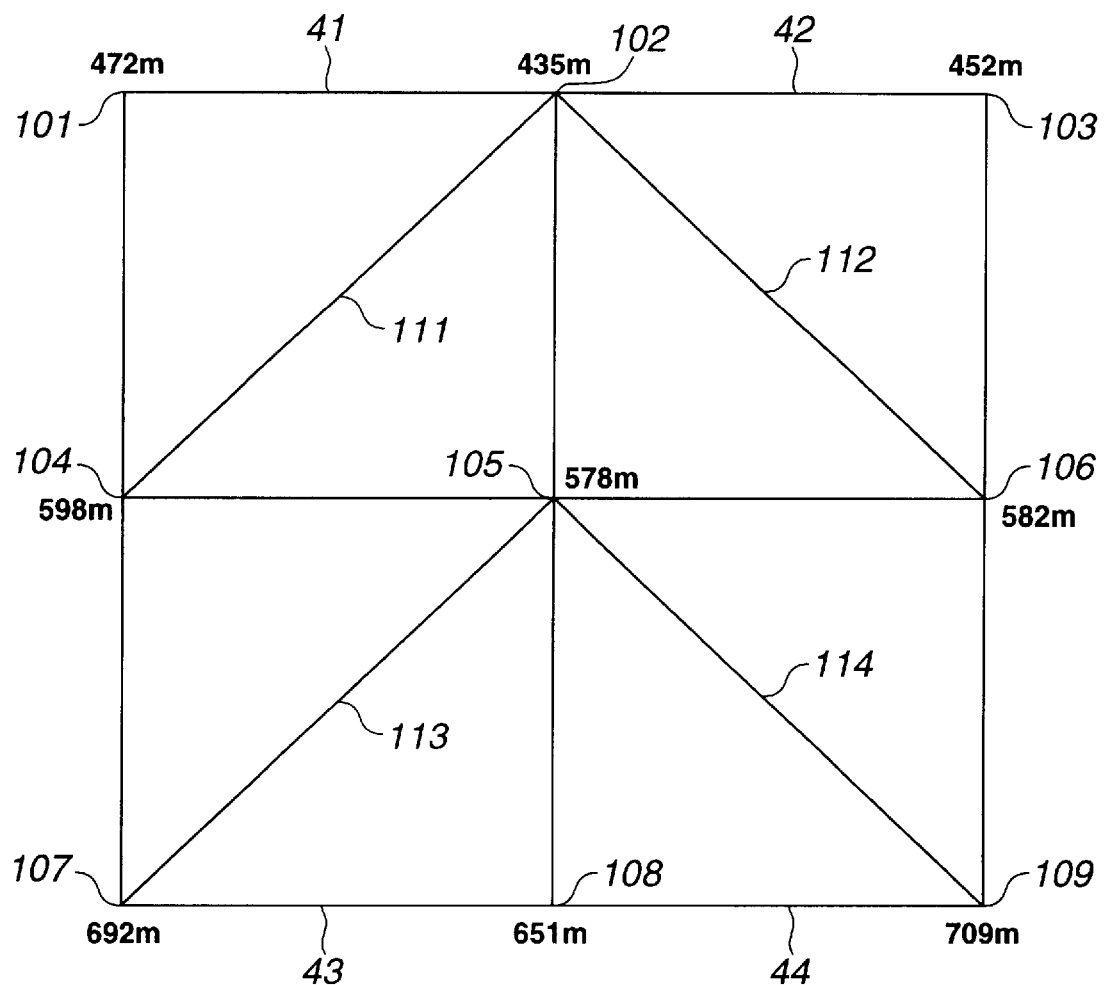
FIG. 23 is an explanatory view for explaining the division of each virtually formed (generated) quadrilateral into the triangular elements in the fourth embodiment shown in FIG. 21.

FIG. 23 shows an example of the selection of one of the diagonal lines of each generated quadrilateral in the case of the fourth embodiment.

As shown in FIG. 23, the quadrilaterals 41, 42, 43, and 44 have respectively corresponding vertices 101, 102, 103, 104, 105, 106, 107, 108, and 109 whose altitude data are 472 meters (m), 435 m, 452 m, 598 m, 578 m, 582 m, 692 m, 651 m, and 709 m.

For one of the quadrilaterals 41, the diagonal line 111 connecting the vertices 102 and 104 is selected. For one of the quadrilaterals 42, the diagonal line 112 connecting the vertices 105 and 107 is selected. For one of the quadrilaterals 43, the diagonal line 113 connecting the vertices 105 and 109 is selected.

After the processing of A-3 shown in FIG. 22 is executed as the routine A for the representative one of the quadrilaterals to derive the division of the corresponding quadrilateral into the triangular element and stereoscopic topographic map data, the display color is allocated to each triangular element on the basis of the altitude data upon execution of the detailed processing of B-1 in FIG. 10 as the routine B of the step S105 in the same way as the first embodiment.

Then, the routine shown in FIG. 5 is executed for all read altitude data (refer to the step S106 of FIG. 5).

Figure 24:
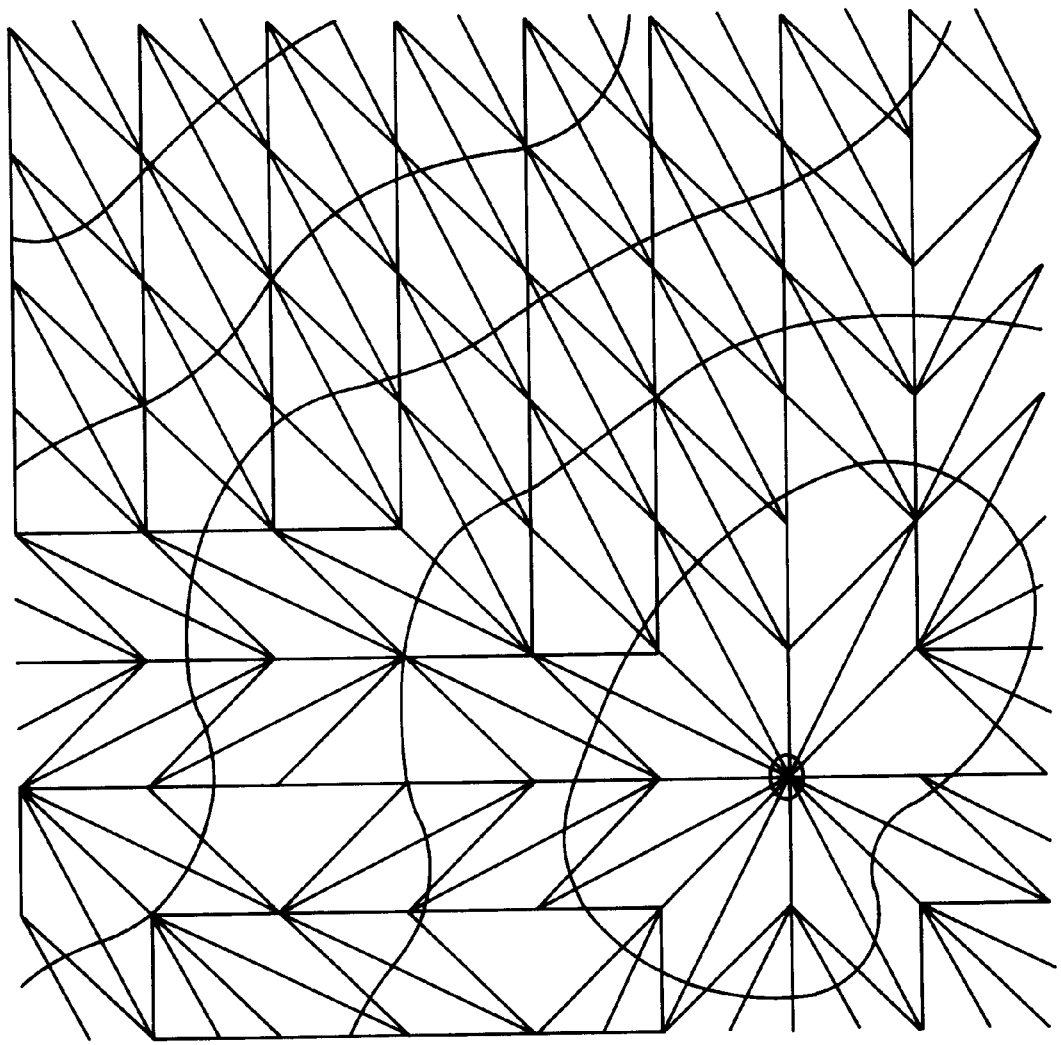
FIG. 24 is an explanatory view for explaining an example of the division of the quadrilateral of a whole region to be displayed into the triangle element in the fourth embodiment shown in FIG. 21.

FIG. 24 shows a division state by means of triangular elements in the road map information as a certain road map region in the case of the fourth embodiment.

After the division processing into the triangular elements, the transformation processing of the altitude data onto the stereoscopic topographical map (terrain) display coordinates, and the allocation processing of the display colors are carried out to achieve the final drawing data.

Consequently, the drawing data are displayed on the image screen of the display unit 13 so as to enable the bird's eye view representation of the stereoscopic terrain (topographic map).

According to the method in the fourth embodiment, the number of triangular elements for the stereoscopic terrain representation are approximately half as large as that in the case of the first embodiment so that the quantity of calculations can accordingly be reduced and the display speed can also be quickened.

As compared with the case of the second embodiment, since a criterion of selection on the diagonal lines of the quadrilaterals is simplified in the case of the fourth embodiment, it is not necessary to derive the altitude data of each middle point so that the quantity of calculations can further be reduced and the display speed can further be quickened.

It is noted that it is possible in the fourth embodiment to adopt the processing routine of B-2 as described in the third embodiment, thus the quantity of calculations being furthermore reduced and the display speed being quickened.

(Fifth Embodiment)

FIGS. 25, 26A, 26B, and 27 show a fifth preferred embodiment of the method for stereoscopically displaying the topographic map according to the present invention.

Figure 26A:
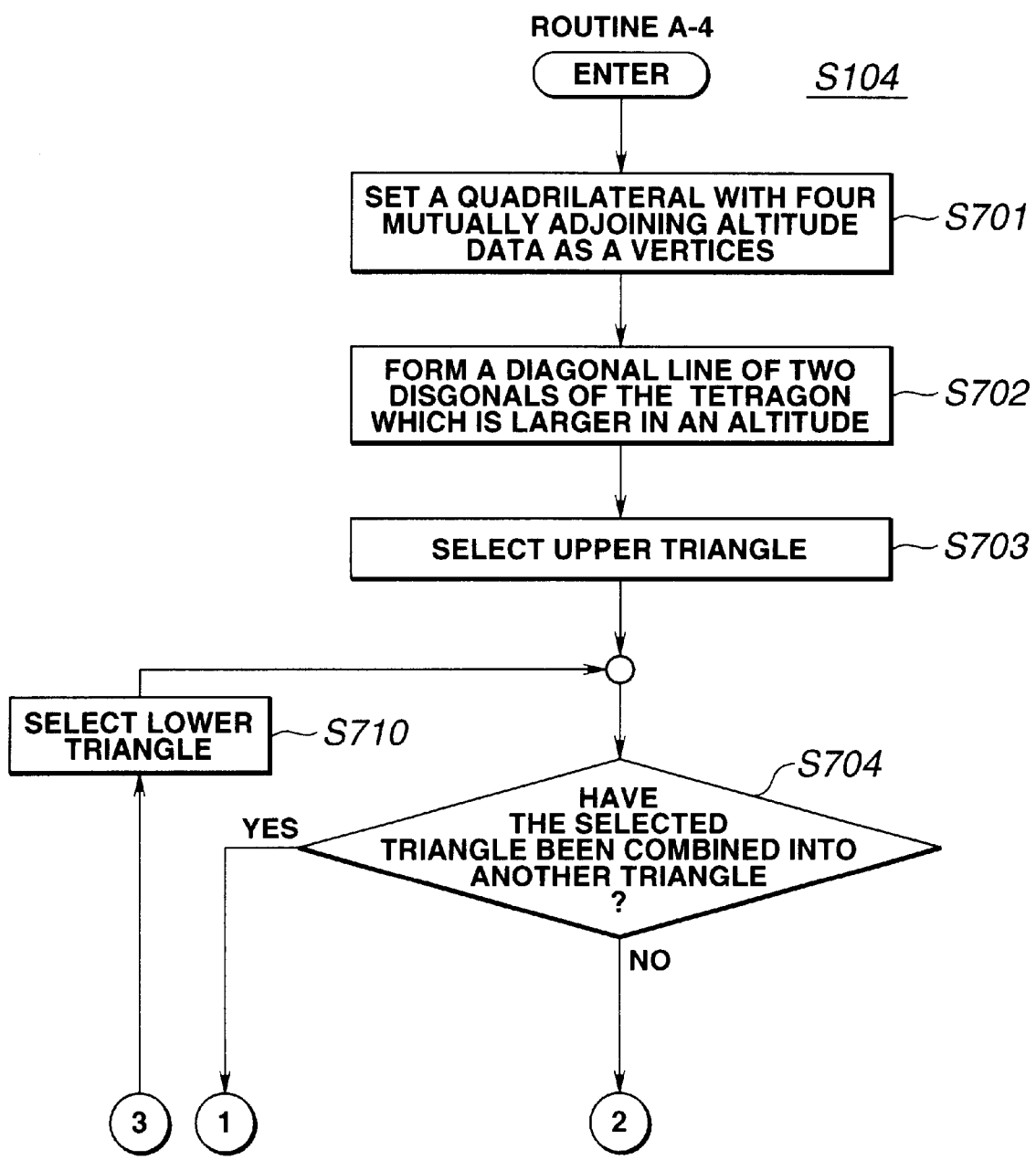
FIGS. 26A and 26B are integrally a detailed flowchart of the routine A as a routine A-4 in the fifth embodiment shown in FIG. 25.
Figure 26B:
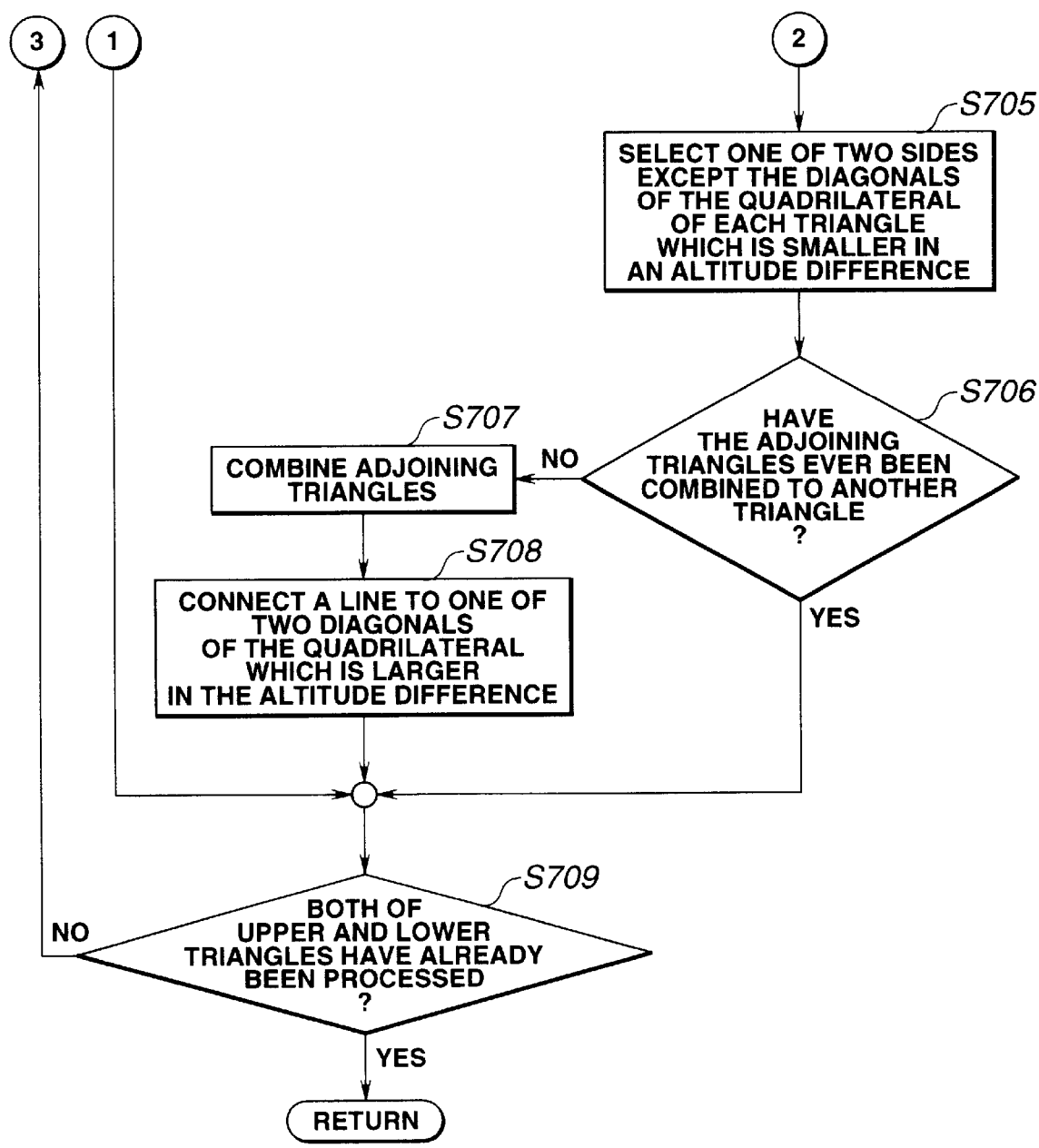
Figure 27:
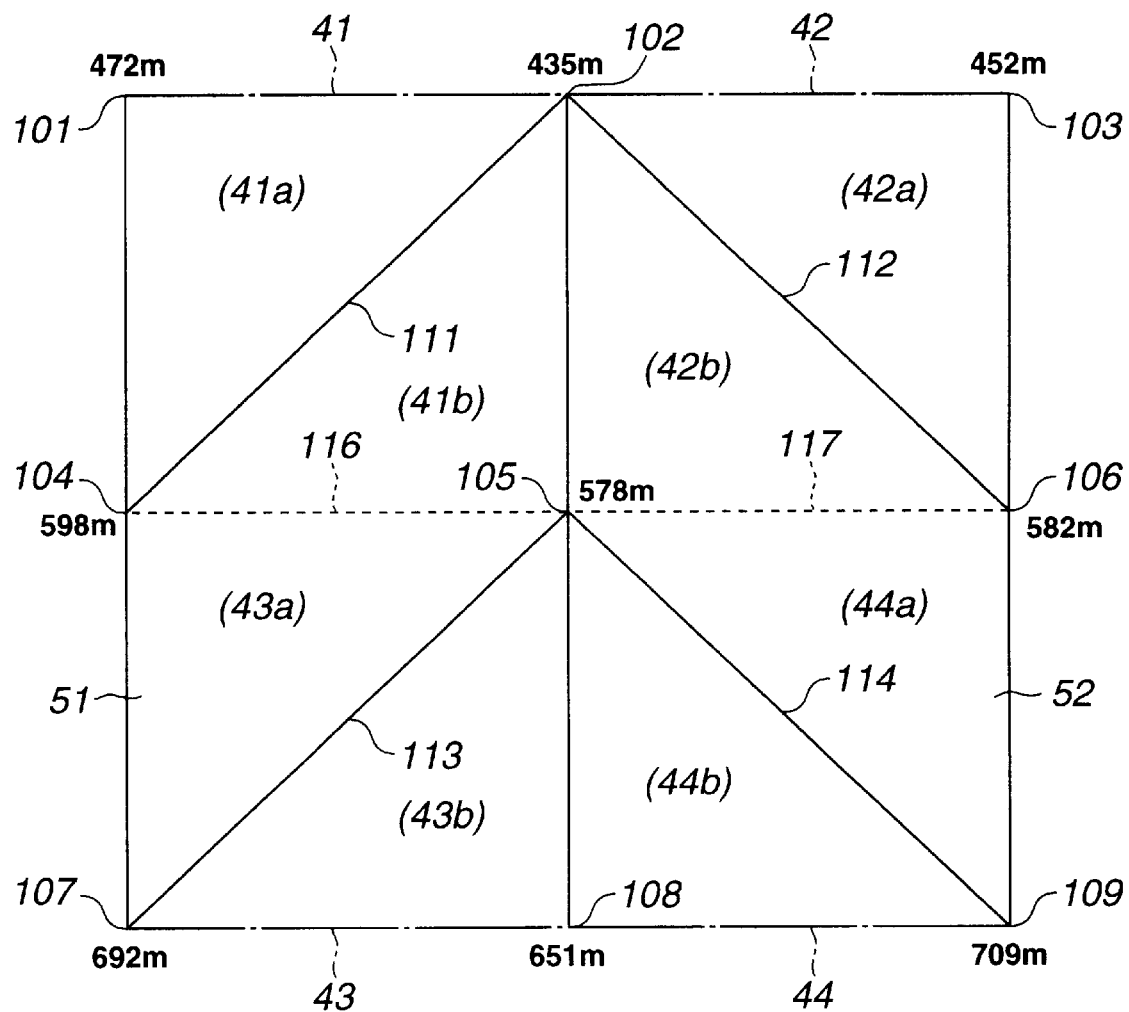
FIG. 27 is an explanatory view for explaining the division of each virtually formed (generated) quadrilateral into the triangular elements in the fifth embodiment shown in FIG. 25.

In the fifth embodiment, the detailed processing of A-4 shown in FIGS. 26A and 26b is executed in place of the detailed processing routine of A-1 in FIG. 10 as the routine A at the step S104 shown in the flowchart of FIG. 5 in the case of the first embodiment. The hardware structure is the same as that in the case of the first embodiment.

Figure 25:
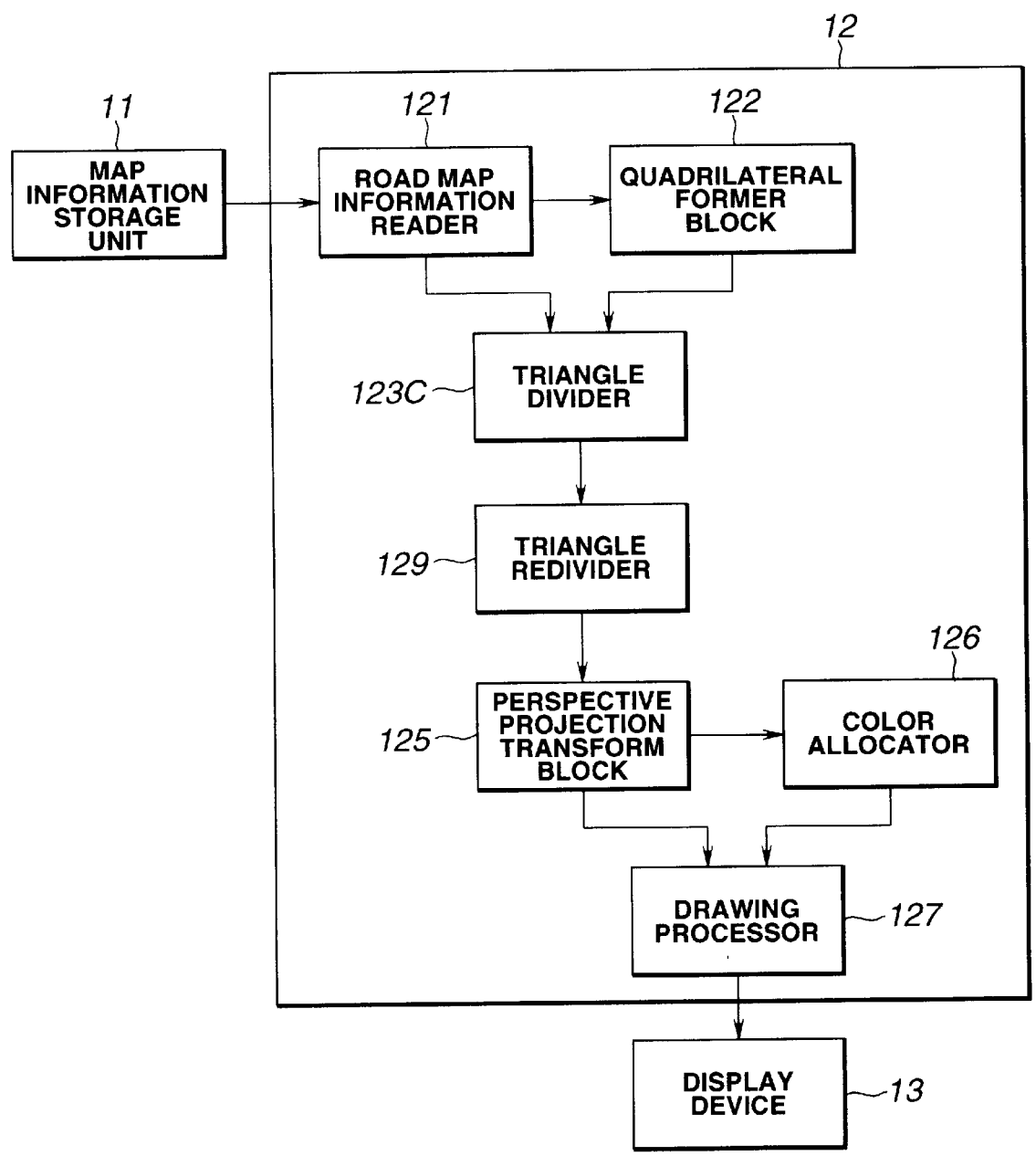
FIG. 25 is a schematic functional block diagram of the calculation processing device in a fifth preferred embodiment according to the present invention.

FIG. 25 shows a functional block diagram of the calculation processing device 12 in the case of the fifth embodiment.

That is to say, the calculation processing device 12 in the fifth embodiment functionally includes: the road map information reader 121 for reading the three5 dimensional road map information belonging to the predetermined road map region to be displayed from the map information storage unit 11; the quadrilateral former 122B for virtually forming (generating) the multiple number of quadrilaterals with the mutually adjoining four points of locations as vertices from the read three-dimensional road map information belonging to the predetermined road map region to be displayed; the triangle divider 123C for selecting one of the diagonal lines of each quadrilateral generated by the quadrilateral former 122 whose related altitude difference between its corresponding two vertices is larger than the other altitude difference between the other two of the four vertices for each of the quadrilaterals virtually generated by the quadrilateral former 122, connecting the corresponding two vertices by the selected diagonal line, and dividing each of the quadrilaterals into two triangular elements; a triangle re-division block (re-divider) 129 for integrating mutually adjoining triangular elements by a side whose end vertices have a smallest altitude difference from among the three sides of each corresponding triangular element into a new quadrilateral, selecting one of the two diagonal lines of the new quadrilateral whose related altitude difference between its corresponding two vertices is larger than that of the other diagonal line between the other two vertices of the new quadrilateral, connecting the corresponding two vertices by the selected diagonal line, and dividing the new quadrilateral into new two triangular elements via the selected diagonal line; the perspective projection transformation (transform) block 125 for performing the perspective projection transformation for the vertices of each triangle; the color allocator 126 for allocating the display color to each of the perspectively projected triangles; and the drawing processor 127 for displaying the allocated display colors together with each triangle on the image screen of the display unit 13.

In the detailed processing of A-2 shown in FIG. 26 executed by the calculation processing device 20, the calculation processing device 20 generates each original quadrilateral with the four mutually adjoining altitude data as vertices for the read three-dimensional altitude data at the predetermined grid (lattice) interval on the specified road map region to be displayed and rearranges the terrain into the collection of quadrilateral elements (at a step S701 of FIG. 26A).

At a step S702, the calculation processing device 20 shown in FIG. 25 compares the two altitude differences between the two couples of the vertices of the corresponding one of the generated quadrilaterals in the diagonal relationships, connects the one couple of the vertices whose altitude difference is larger than the other couple thereof by the corresponding one of the diagonal lines, so that the connected diagonal line is used to divide the corresponding quadrilateral into two triangular elements at the step S702.

Next, at a step S703, the calculation processing device 12 selects an upper triangular element from among the divided two triangular elements.

At a step S704, the calculation processing device 12 determines whether the selected triangular element is already integrated with another of the triangular elements.

If the selected triangular element is not already integrated into the other triangular element (No) at the step S704, the routine of FIG. 26A goes to a step S705.

At the step S705, the calculation processing device 12 selects one of two sides constituting the sides of the original quadrilateral which has a smaller altitude difference. Then, the routine of FIG. 26B goes to a step S706.

At the step S706, the CPU, viz., the calculation processing device 12 determines whether the triangular element adjoining the selected side is already integrated with the other rectangular element.

If the calculation processing device 12 determines that the triangular element adjoining the selected side is not already integrated into the other triangular element (No) at the step S706, the routine goes to a step S707.

At the step S707, the calculation processing device 12 integrates the triangular element adjoining the selected side at the step S705 with the upper triangular element selected at the step S703 to generate the new quadrilateral.

At the next step S708, the calculation processing device 12 compares the altitude differences between the two couples of the vertices of the new quadrilateral in the respective diagonal relationships, selects one of the two couples of the vertices of the new quadrilateral which has a larger altitude difference, and connects the selected couple of the vertices by the corresponding diagonal line to divide the new quadrilateral into the new triangular elements.

Upon the completion of the processing for the upper triangular element selected at the step S703, the routine of FIG. 26B goes from a step S709 to a step S710 of FIG. 26A. At the step S710, the calculation processing device 12 selects the remaining lower triangular element and repeats the steps of S704 and S708.

According to the processing routine of A-4 in FIGS. 26A and 26B, in a case where the respective vertices 101, 102, 103, 104, 105, 106, 107, 108, and 109 of the original quadrilaterals 41, 42, 43, and 44 have altitude data of, e.g., 472 m, 435 m, 452 m, 598 m, 578 m, 582 m, 692 m, 651 m, and 709 m, the diagonal line 111 connecting the vertices 102–104 is selected for one of the original quadrilaterals 41, the diagonal line 112 connecting the vertices 102–106 is selected for one of the original quadrilaterals 43, and the diagonal line 113 connecting the vertices 105–107 is selected for one of the original quadrilaterals 44.

Then, for two of the quadrilaterals 43 and 44, the upper triangular elements 43a and 44a are selected at the step S903 of FIGS. 26A and 26B and the sides 116 and 117 are selected as the smaller altitude difference at the step S705 of FIGS. 26A and 26B.

Then, at the step S707, the lower triangular elements 41*b* and 42*b* as the other triangular elements mutually adjoining the selected sides 116 and 117 are integrated together, respectively, to generate the new quadrilateral 51 (102, 104, 107, 105) integrating the two triangular elements 41*b* and 43*a* and the new quadrilateral 52 (102, 105, 109, 106) integrating the two triangular elements 42*b* and 44*a*.

Figure 28:
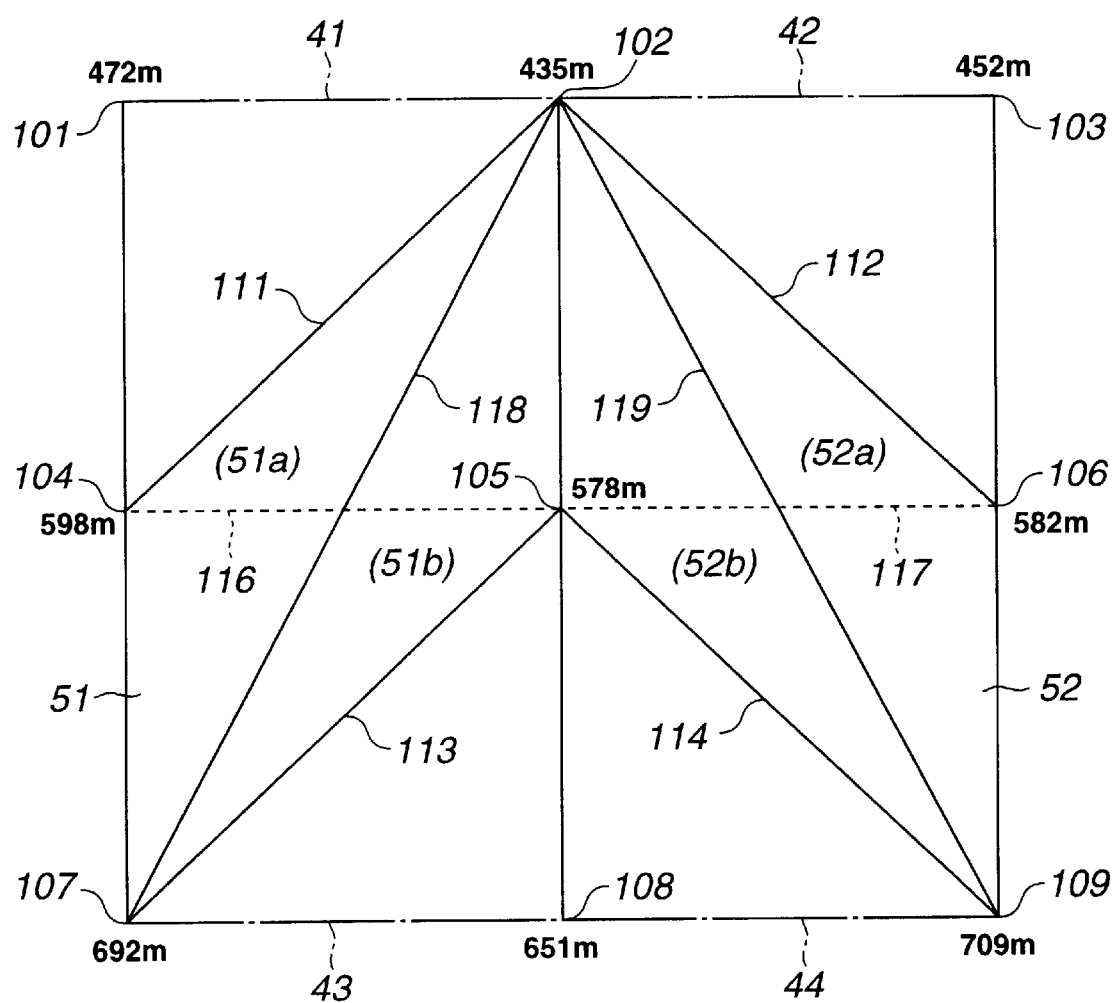
FIG. 28 is an explanatory view for explaining a re-division of each virtually formed quadrilateral into the triangular elements in the fifth embodiment shown in FIG. 25.

At the subsequent step S708, as shown in FIG. 28, the integrated two quadrilaterals 51 and 52 are divided into the respective new two triangular elements 51*a* and 51*b* and 52*a* and 52*b*, respectively, by means of the diagonal lines 118 and 119 connecting the vertices whose altitude difference is larger than that of the other vertices thereof.

After the division processing into the triangular elements, the transformation processing of the altitude data onto the stereoscopic topographical map (terrain) display coordinates, and the allocation processing of the display colors are carried out to achieve the final drawing data.

Then, the routine shown in FIG. 5 is executed for all read altitude data (refer to the step S106 of FIG. 5).

Figure 29:
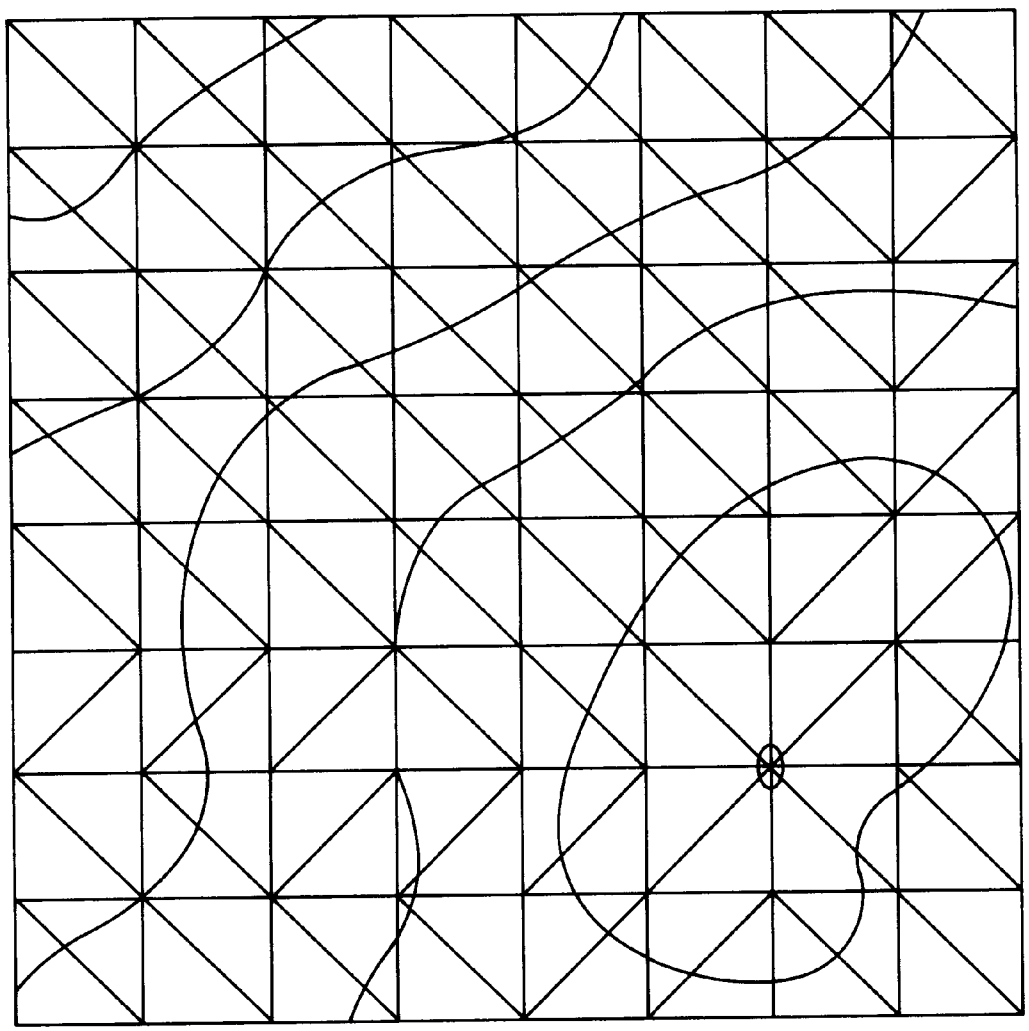
FIG. 29 is an explanatory view for explaining an example of the division of the quadrilaterals of the whole region to be displayed into the triangular elements in the fifth embodiment shown in FIG. 25.

FIG. 29 shows a division state by means of triangular elements in the road map information as a certain road map region in the case of the fifth embodiment.

Consequently, the drawing data are displayed on the image screen of the display unit 13 so as to enable the bird's eye view representation of the stereoscopic terrain (topographic map).

According to the method in the fifth embodiment, the number of triangular elements for the stereoscopic terrain representation are approximately half as large as that in the case of the first embodiment so that the quantity of calculations can accordingly be reduced and the display speed can also be quickened.

As compared with the case of the second embodiment, since a criterion of selection on the diagonal lines of the quadrilaterals is simplified in the case of the fourth embodiment, it is not necessary to derive the altitude data of each middle point so that the quantity of calculations can further be reduced and the display speed can further be quickened.

It is noted that it is possible in the fifth embodiment to adopt the processing routine of B-2 as described in the third embodiment, thus the quantity of calculations being furthermore reduced and the display speed being quickened.

(Sixth Embodiment)

Figure 30:
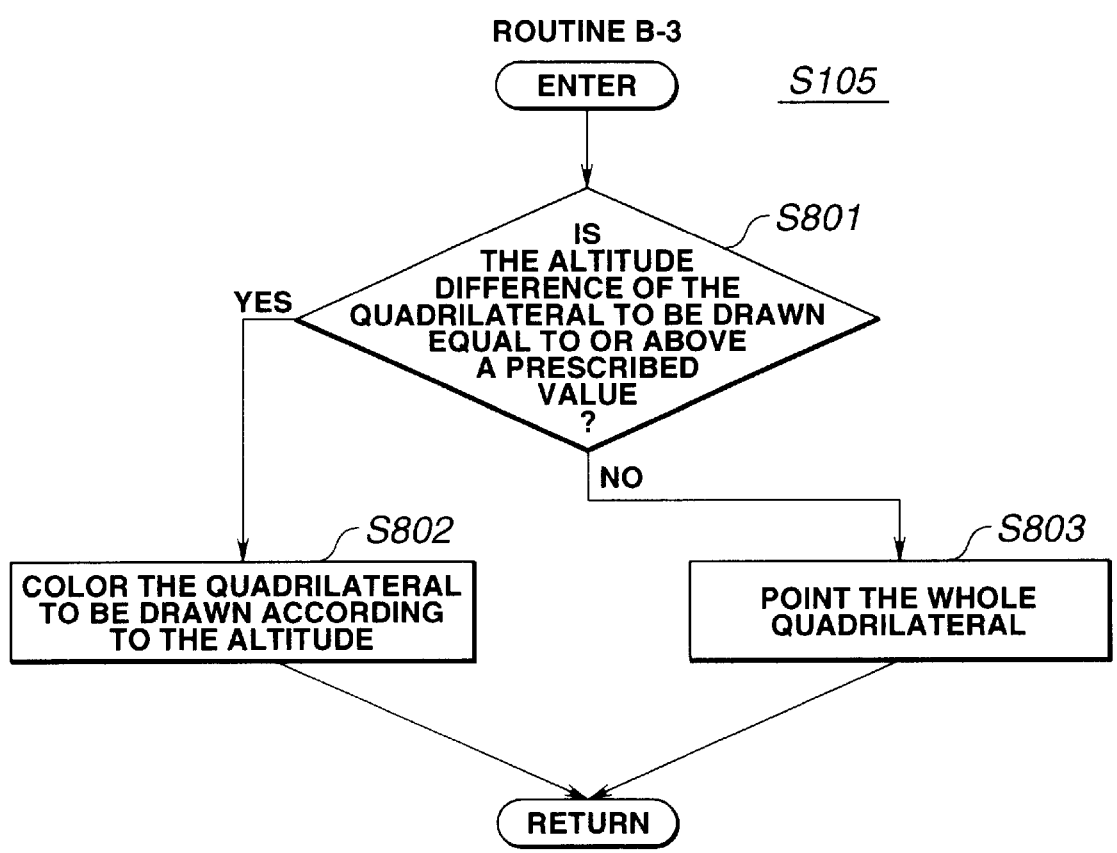
FIG. 30 is a detailed flowchart of the routine B as a routine B-3 in a sixth preferred embodiment according to the present invention.
Figure 31:
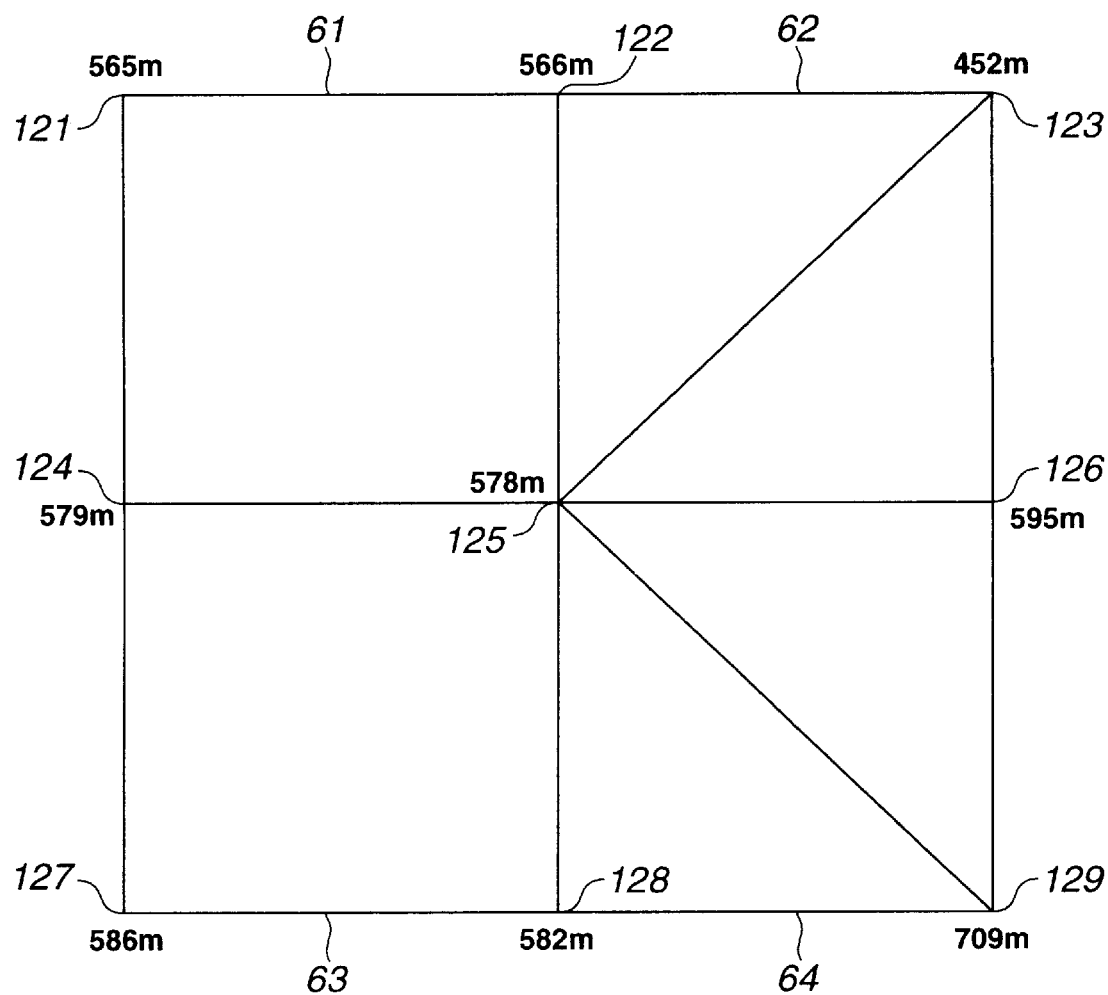
FIG. 31 is an explanatory view for explaining the division of each virtually formed (generated) quadrilateral into the triangular elements in the sixth embodiment according to the present invention.
Figure 32:
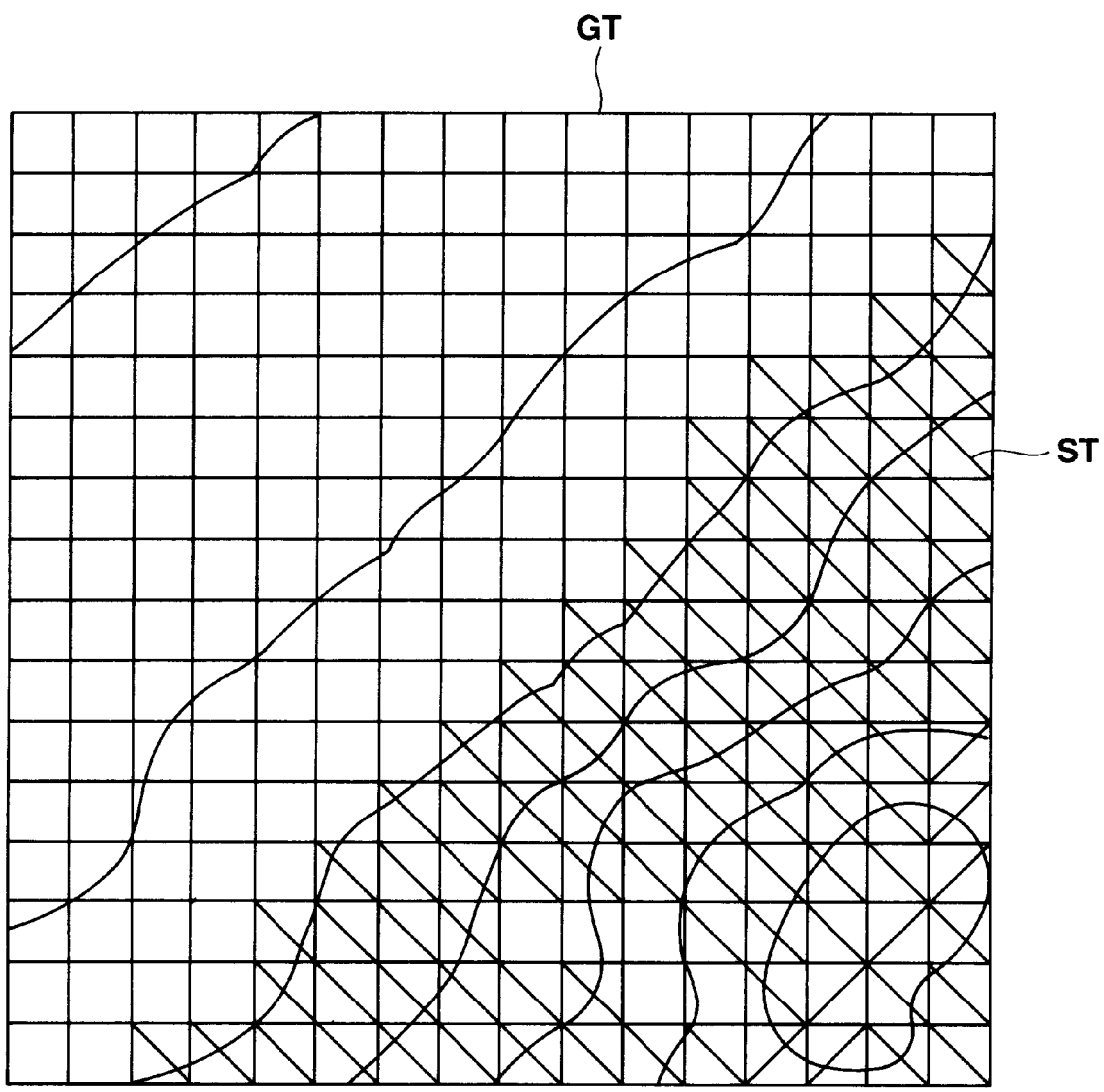
FIG. 32 is an explanatory view for explaining an example of the division of the quadrilaterals in the whole region to be displayed into the triangular elements in the sixth embodiment.

Next, FIGS. 30, 31, and 32 show a sixth preferred embodiment of the method for stereoscopically displaying the topographic map according to the present invention.

In the sixth embodiment, a detailed processing routine of B-3 shown in FIG. 30 is executed as the routine B of the step S105 of the flowchart shown in FIG. 5 as the main routine in the first embodiment.

In addition, as the routine A at the step S105, any one of the detailed processing routine of A-1 in FIG. 10, of A-2 in FIG. 15, and of A-3 in FIG. 22 may be executed.

Namely, in the sixth embodiment, the detailed processing routine of B-3 shown in FIG. 30 is executed as the processing routine B in the case of any one of the first, second, fourth, and fifth embodiment.

The hardware structure in the case of the sixth embodiment is shown in FIGS. 1A and 1B in the same way as described in the first embodiment.

As shown in FIG. 30, the calculation processing device 12 determines, at a step S801, whether the altitude difference between the four vertices of the quadrilaterals, i.e., between a maximum value of the corresponding altitude data and a minimum value thereof from among the four vertices is equal to or above or below its prescribed limit value.

If the CPU 12A, viz., the calculation processing device 12 is equal to or above the prescribed limit (Yes) at the step S801, the routine goes to a step S802.

At the step S802, the CPU 12A (the calculation processing device 12) allocates the display color according to the altitude data on the corresponding quadrilateral to each corresponding one of the triangular element obtained at the routine A.

On the other hand, if the altitude difference on the corresponding one of the quadrilaterals is below the prescribed limit (NO) at the step S801, the calculation processing device 12 allocates the single display color according to the altitude data over the whole quadrilaterals whose altitude difference on the vertices are determined to be below the prescribed limit since the corresponding terrain is relatively moderate (flat).

Then, the routines of A-1, A-2, A-3, or A-4 as the routine A and the routine B-3 as the routine B are repeated for all read altitude data (refer to the step S106 shown in FIG. 5).

According to the detailed processing routine of B-3 shown in FIG. 30, with the altitude data of the vertices 121, 122, 123, 124, 125, 126, 127, 128, and 129 of the respective quadrilaterals 61, 62, 63, and 64 generated by the first read altitude data in mind, not rested on the process of the routine A, depending upon whether the altitude difference between the maximum value and minimum value are equal to or above the prescribed limit (for example, 50 meters), the calculation processing device 12 selects one of the two methods, namely, painting out the whole original quadrilaterals by means of the single display processing or adopting the triangular elements generated by the routine or adopting the triangular elements generated by the routine A and allocating the display colors to the respective triangular elements on the basis of their altitude data.

In an example shown in FIG. 31, since the altitude difference between the vertices is smaller than the prescribed limit of 50 meters for the two original quadrilaterals 61 and 63, the calculation processing device 12 deems that the quadrilaterals 61 and 63 represent and paints out the whole quadrilaterals 61 and 63 by a single color.

However, since the altitude difference between the vertices exceed the prescribed limit of 50 meters for the original quadrilaterals 62 and 64, the calculation processing device 12 adopts the triangular elements generated by the routine A described above and allocates the display colors to the respective triangular elements.

FIG. 22 shows an example of the bird's eye view representation of the stereoscopic terrain displayed on the image screen of the display unit 13 and generated by the method in the sixth embodiment.

According to the method for stereoscopically displaying the topographic map in the sixth embodiment, a terrain region GT having the relatively flat ground surface is displayed with the single color for each quadrilateral and only another terrain region ST having the relatively steep ground surface is displayed with the display colors allocated to the individual triangular elements.

Consequently, the quantity of the graphic data can be reduced and the display speed can accordingly be quickened.

It is noted that the specific value of the prescribed limit value on the altitude difference is not limited to 50 meters described above but may be varied according to a scale of reduction on the bird's eye view representation.

It is also noted that if an application program of executing the method for stereoscopically displaying the topographic map applicable to the navigation system in each of the first, second, third, fourth, fifth, and sixth embodiments is recorded in the recording medium such as the CD-ROM, MO, or DVD and is installed in the program storage unit 15 via the calculation processing device 12, the calculation processing device 12 can be used as the navigation system which executes the method for stereoscopically displaying the topographic map described above.

What is claimed is:

1. A method of stereoscopically displaying a topographic map for a navigation system, the method comprising the steps of:

a) reading a three-dimensional road map information belonging to a predetermined region to be displayed from a road map information recording medium;

b) generating virtually a multiple number of quadrilaterals with mutually adjoining four points of terrain locations as four vertices of each quadrilateral from the read three-dimensional road map information;

c) connecting two couples of the vertices, each couple in a diagonal relationship, by respective two diagonal lines of each quadrilateral so as to derive a position of a middle point of each quadrilateral;

d) dividing each quadrilateral into four triangles with the connected two diagonal lines;

e) deriving an altitude of each middle point from the read three-dimensional road map information;

f) performing a perspective projection transformation of three vertices of each triangle including the middle point of the corresponding quadrilateral divided into each triangle onto a predetermined perspectively projected plane with a first predetermined position as a viewpoint for the perspective projection and a second predetermined position as an origin of the predetermined perspectively projected plane;

g) allocating a display color to each of the perspectively projected triangles; and h) displaying the allocated display color on an image screen of a display device together with each of the perspectively projected triangles.

2. A method of stereoscopically displaying a topographic map for a navigation system, the method comprising the steps of:

a) reading a three-dimensional road map information belonging to a predetermined region to be displayed from a road map information recording medium;

b) generating virtually a multiple number of quadrilaterals with mutually adjoining four points of terrain location as four vertices of each quadrilateral from the read three-dimensional road map information;

c) selecting one of two diagonal lines of each quadrilateral according to a solid geometric form based on altitudes of the four vertices of each quadrilateral;

d) connecting one couple of two vertices in a diagonal relationship from among the four vertices of each quadrilateral by the selected diagonal line;

e) dividing each quadrilateral into two triangles by the selected diagonal line;

f) performing a perspective projection transformation of the three vertices of each triangle onto a predetermined perspectively projected plane with a first predetermined position as a viewpoint for the perspective projection and a second predetermined position as an origin of the predetermined perspectively projected plane;

g) allocating a display color to each of the perspectively projected triangles; and h) displaying the allocated display color on an image screen of a display device together with each of the perspectively projected triangles.

3. A method of stereoscopically displaying a topographic map for a navigation system as claimed in claim 2, wherein the step of c) includes a step i) of selecting one of the two diagonal lines of each quadrilateral whose connected corresponding one couple of two vertices have an altitude difference larger than the other couple of two vertices of each quadrilateral.

4. A method of stereoscopically displaying a topographic map for a navigation system as claimed in claim 3, wherein the steps of c), d), and e) further includes the steps of:

j) integrating mutually adjoining triangles via a common side to each adjoining triangle, the common side including the corresponding two vertices which has a relatively small altitude difference therebetween into a new quadrilateral after the steps of i) and d);

k) selecting one of the two diagonal lines of each new quadrilateral integrated at the step j) whose corresponding one couple of two vertices have the altitude difference larger than the other couple of two vertices of each new quadrilateral integrated at the step j); and l) connecting the corresponding one couple of two vertices of each quadrilateral as the new quadrilateral as the new quadrilateral by the diagonal line selected at the step k) so as to divide each quadrilateral as the new quadrilateral into two triangles as the new triangle at the step e).

5. A method of stereoscopically displaying a topographic map for a navigation system as claimed in claim 2, wherein, at the step f), the perspective projection transformation is performed for the vertices of each quadrilateral which is located by a predetermined distance or more far away from the viewpoint and wherein, at the step g), a single color is allocated to each of the quadrilaterals perspectively projected at the step e).

6. A method of stereoscopically displaying a topographic map for a navigation system as claimed in claim 2, wherein the steps of c), d), and e) further includes the steps of:

j) integrating mutually adjoining triangles via a common side to each adjoining triangle, the common side including the corresponding two vertices which has a relatively small altitude difference therebetween into a new quadrilateral after the steps of i) and d);

k) selecting one of the two diagonal lines of each new quadrilateral integrated at the step j) whose corresponding one couple of two vertices have the altitude difference larger than the other couple of two vertices of each new quadrilateral integrated at the step j); and l) connecting the corresponding one couple of two vertices of each quadrilateral as the new quadrilateral as the new quadrilateral by the diagonal line selected at the step k) so as to divide each quadrilateral as the new quadrilateral into two triangles as the new triangle at the step e).

7. An apparatus of stereoscopically displaying a topographic map for a navigation system, comprising:

a) a storage unit for recording a three-dimensional road map information;

b) a reader for reading the three-dimensional road map information belonging to a predetermined region to be displayed from the storage unit;

c) a quadrilateral forming block for generating virtually a multiple number of quadrilaterals with mutually adjoining four points of terrain locations as four vertices of each quadrilateral from the read three-dimensional road map information;

d) a middle point altitude deriving block for connecting two couples of the vertices, each couple in a diagonal relationship, by respective two diagonal lines of each quadrilateral so as to derive a position of a middle point of each quadrilateral;

e) a triangle divider for dividing each quadrilateral into four triangles with the connected two diagonal lines;

f) an altitude deriving block for deriving an altitude of each middle point from the read three-dimensional road map information;

g) a perspective projection transforming block for performing a perspective projection transformation of the vertices of each triangle including the corresponding middle point onto a predetermined perspectively projected plane with a first predetermined position as a viewpoint for the perspective projection and a second predetermined position as an origin of the predetermined perspective projection;

h) a color allocating block for allocating a display color to each of the perspectively projected triangles; and i) a drawing processing block for displaying the allocated display color on an image screen of a display device together with each of the perspectively projected triangles.

8. An apparatus of stereoscopically displaying a topographic map for a navigation system, comprising:

a) a road map information recording medium for recording a three-dimensional read map information;

b) a reader for reading a three-dimensional road map information belonging to a predetermined region to be displayed from a road map information recording medium;

c) a quadrilateral forming block for generating virtually a multiple number of quadrilaterals with mutually adjoining four points of terrain locations as four vertices of each quadrilateral from the read three-dimensional road map information;

d) a triangle former for selecting one of two diagonal lines of each quadrilateral according to a solid geometric form based on altitudes of the four vertices of each quadrilateral and connecting one couple of two vertices in a diagonal relationship by the selected diagonal line;

e) a triangle divider for dividing each quadrilateral into two triangles with the selected diagonal line;

f) a perspective projection transforming block for performing a perspective projection transformation of the vertices of each triangle onto a predetermined perspectively projected plane with a first predetermined position as a viewpoint for the perspective projection and a second predetermined position as an origin of the predetermined perspectively projected plane;

g) a color allocator for allocating a display color to each of the perspectively projected triangles; and h) a drawing processing block for displaying the allocated display color on an image screen of a display device together with each of the perspectively projected triangles.

9. An apparatus of stereoscopically displaying a topographic map for a navigation system as claimed in claim 8, wherein the triangle divider further includes a selector for selecting one of two diagonal lines of each quadrilateral whose connected corresponding one couple of two vertices has an altitude difference larger than the other of the two vertices of each quadrilateral.

10. An apparatus of displaying stereoscopically a topographic map for a navigation system as claimed in claim 9, which further comprises an integrator for integrating mutually adjoining triangles via a common side to each adjoining triangle, the common side including the corresponding two vertices which has a relatively small altitude difference therebetween into a new quadrilateral; a selector for selecting one of the two diagonal lines of each new corresponding one of the two diagonal lines of each new quadrilateral integrated by the integrator whose corresponding one couple of two vertices has the altitude difference larger than the other couple of two vertices of each new quadrilateral integrated by the integrator; and a connector for connecting the corresponding one couple of two vertices of each quadrilateral as the new quadrilateral by the diagonal line selected by the selector so as to divide each quadrilateral as the new quadrilateral into two triangles as the new triangle.

11. An apparatus of stereoscopically displaying a topographic map for a navigation system as claimed in claim 8, wherein the perspective projection transformation is performed for the vertices of each quadrilateral which is located by a predetermined distance or more far away from the viewpoint and wherein the allocator allocates a single color to each quadrilateral perspectively projected by the perspective projection transforming block.

12. An apparatus of stereoscopically displaying a topographic map for a navigation system as claimed in claim 8, wherein the perspective projection transformation is performed for the vertices of each quadrilateral each one of the four vertices of which has the altitude difference from the other one of the four vertices by an altitude difference value smaller than a prescribed limit value and wherein the allocator allocates a single color to each quadrilateral perspectively projected by the perspective projection transforming block.

13. A medium of recording a stereoscopically topographic map display program, the program having the steps of:

a) reading a three-dimensional road map information belonging to a predetermined region to be displayed from a road map information recording medium;

b) generating virtually a multiple number of quadrilaterals with mutually adjoining four points of terrain locations as four vertices of each quadrilateral from the read three-dimensional road map information;

c) connecting two couples of the vertices, each couple in a diagonal relationship, by respective two diagonal lines of each quadrilateral so as to derive a position of a middle point of each quadrilateral;

d) dividing each quadrilateral into four triangles with the connected two diagonal lines;

e) deriving an altitude of each middle point from the read three-dimensional road map information;

f) performing a perspective projection transformation of three vertices of each triangle including the middle point of the corresponding quadrilateral divided into each triangle onto a predetermined perspectively projected plane with a first predetermined position as a viewpoint for the perspective projection and a second predetermined position as an origin of the predetermined perspectively projected plane;

g) allocating a display color to each of the perspectively projected triangles; and h) displaying the allocated display color on an image screen of a display device together with each of the perspectively projected triangles.

14. A medium of recording a stereoscopically topographic map display program, the program having the steps of:

a) reading a three-dimensional road map information belonging to a predetermined region to be displayed from a road map information recording medium;

b) generating virtually a multiple number of quadrilaterals with mutually adjoining four points of terrain location as four vertices of each quadrilateral from the read three-dimensional road map information;

c) selecting one of two diagonal lines of each quadrilateral according to a solid geometric form based on altitudes of the four vertices of each quadrilateral;

d) connecting one couple of two vertices in a diagonal relationship from among the four vertices of each quadrilateral by the selected diagonal line;

e) dividing each quadrilateral into two triangles by the selected diagonal line;

f) performing a perspective projection transformation of the three vertices of each triangle onto a predetermined perspectively projected plane with a first predetermined position as a viewpoint for the perspective projection and a second predetermined position as an origin of the predetermined perspectively projected plane;

g) allocating a display color to each of the perspectively projected triangles; and h) displaying the allocated display color on an image screen of a display device together with each of the perspectively projected triangles.

15. A medium of recording a stereoscopically topographic map display program as claimed in claim 14, wherein the step of c) includes a step i) of selecting one of the two diagonal lines of each quadrilateral whose connected corresponding one couple of two vertices have an altitude difference larger than the other couple of two vertices of each quadrilateral.

16. A medium of recording a stereoscopically topographic map display program as claimed in claim 15, wherein the steps of c), d), and e) further includes the steps of:

j) integrating mutually adjoining triangles via a common side to each adjoining triangle, the common side including the corresponding two vertices which has a relatively small altitude difference therebetween into a new quadrilateral after the steps of i) and d);

k) selecting one of the two diagonal lines of each new quadrilateral integrated at the step j) whose corresponding one couple of two vertices have the altitude difference larger than the other couple of two vertices of each new quadrilateral integrated at the step j); and l) connecting the corresponding one couple of two vertices of each quadrilateral as the new quadrilateral as the new quadrilateral by the diagonal line selected at the step k) so as to divide each quadrilateral as the new quadrilateral into two triangles as the new triangle at the step e).

17. A medium of recording a stereoscopically topographic map display program as claimed in claim 14, wherein the steps of c), d), and e) further include the steps of:

j) integrating mutually adjoining triangles via a common side to each adjoining triangle, the common side including the corresponding two vertices which has a relatively small altitude difference therebetween into a new quadrilateral after the steps of i) and d);

k) selecting one of the two diagonal lines of each new quadrilateral integrated at the step j) whose corresponding one couple of two vertices have the altitude difference larger than the other couple of two vertices of each new quadrilateral integrated at the step j); and l) connecting the corresponding one couple of two vertices of each quadrilateral as the new quadrilateral by the diagonal line selected at the step k) so as to divide each quadrilateral into two triangles as the new triangle at the step e).

* * * * *